(12) United States Patent
Yamamoto et al.

(10) Patent No.: US 7,470,192 B2
(45) Date of Patent: Dec. 30, 2008

(54) GAME APPARATUS AND STORAGE MEDIUM STORING GAME PROGRAM

(75) Inventors: Masao Yamamoto, Kyoto (JP); Naoya Kawanobe, Kyoto (JP)

(73) Assignee: Nintendo Co., Ltd., Kyoto-shi, Kyoto (JP)

( * ) Notice: Subject to any disclaimer, the term of this patent is extended or adjusted under 35 U.S.C. 154(b) by 499 days.

(21) Appl. No.: 11/041,282

(22) Filed: Jan. 25, 2005

(65) Prior Publication Data

US 2005/0164784 A1  Jul. 28, 2005

(30) Foreign Application Priority Data

Jan. 28, 2004 (JP) ............... 2004-019908

(51) Int. Cl.
  A63F 13/00  (2006.01)
  A63F 9/24   (2006.01)
  G06F 17/00  (2006.01)
  G06F 19/00  (2006.01)

(52) U.S. Cl. .................. 463/30; 345/179; 709/204

(58) Field of Classification Search .............. 463/30
  See application file for complete search history.

(56) References Cited

U.S. PATENT DOCUMENTS

| | | | |
|---|---|---|---|
| 4,890,098 A | | 12/1989 | Dawes et al. |
| 5,060,170 A | | 10/1991 | Bourgeois et al. |
| 5,405,151 A | | 4/1995 | Naka et al. |
| 5,530,795 A | * | 6/1996 | Wan ............... 715/759 |
| 5,649,104 A | * | 7/1997 | Carleton et al. ........ 709/204 |
| 5,790,818 A | * | 8/1998 | Martin ............... 715/753 |
| 5,802,322 A | * | 9/1998 | Niblett ............... 709/251 |
| 5,877,762 A | * | 3/1999 | Young ............... 715/803 |
| 5,963,199 A | | 10/1999 | Kato et al. |
| 5,971,855 A | | 10/1999 | Ng |
| 6,267,676 B1 | * | 7/2001 | Nagaoka ............. 463/43 |
| 6,295,055 B1 | * | 9/2001 | Miller et al. ......... 715/700 |
| 6,336,865 B1 | * | 1/2002 | Kinjo ............... 463/34 |
| 6,343,313 B1 | * | 1/2002 | Salesky et al. ........ 709/204 |
| 6,347,998 B1 | * | 2/2002 | Yoshitomi et al. ....... 463/42 |
| 6,421,738 B1 | * | 7/2002 | Ratan et al. .......... 719/328 |
| 6,478,679 B1 | | 11/2002 | Himoto et al. |
| 6,527,637 B2 | | 3/2003 | Fujioka et al. |
| 6,560,707 B2 | * | 5/2003 | Curtis et al. ......... 713/163 |
| 6,863,608 B1 | * | 3/2005 | LeMay et al. ......... 463/24 |
| 2002/0082080 A1 | * | 6/2002 | Kojima ............. 463/31 |
| 2002/0092021 A1 | * | 7/2002 | Yap et al. ........... 725/55 |

(Continued)

FOREIGN PATENT DOCUMENTS

JP  11-137838  5/1999

(Continued)

Primary Examiner—Robert E Pezzuto
Assistant Examiner—Paul Anthony D'Agostino
(74) Attorney, Agent, or Firm—Nixon & Vanderhye P.C.

(57) ABSTRACT

A game apparatus includes two LCDs, and a touch panel is provided in relation to the one LCD. When an action game is started, a game screen is displayed on the other LCD, and a still image (capture screen) obtained by copying the game screen according to a capture operation by a player is displayed on the one LCD. When an enemy object on the capture screen is directed, stroked, and so forth by use of the touch panel, the enemy object on the game screen is frozen or erased.

10 Claims, 16 Drawing Sheets

U.S. PATENT DOCUMENTS

| | | |
|---|---|---|
| 2002/0097229 A1 | 7/2002 | Rose et al. |
| 2003/0092493 A1 | 5/2003 | Shimizu et al. |
| 2003/0189670 A1* | 10/2003 | Kennedy et al. ............ 348/601 |
| 2004/0130550 A1* | 7/2004 | Blanco et al. ............... 345/473 |
| 2004/0147314 A1* | 7/2004 | LeMay et al. ................ 463/30 |
| 2004/0152513 A1 | 8/2004 | Shimizu |
| 2004/0201545 A1 | 10/2004 | Yamazaki et al. |
| 2004/0222995 A1* | 11/2004 | Colle ......................... 345/545 |
| 2004/0268397 A1* | 12/2004 | Dunbar et al. ................ 725/88 |
| 2005/0009607 A1 | 1/2005 | Russell et al. |
| 2005/0015731 A1* | 1/2005 | Mak et al. ................... 715/779 |
| 2005/0062726 A1 | 3/2005 | Marsden et al. |
| 2005/0071887 A1* | 3/2005 | Yoshida ...................... 725/135 |
| 2005/0099408 A1* | 5/2005 | Seto et al. ................... 345/179 |
| 2006/0100021 A1* | 5/2006 | Yoshino et al. ............... 463/45 |
| 2006/0128468 A1* | 6/2006 | Yoshikawa et al. ........... 463/36 |
| 2006/0178188 A1* | 8/2006 | LeMay et al. ................ 463/16 |

FOREIGN PATENT DOCUMENTS

| | | |
|---|---|---|
| JP | 2000-259134 | 9/2000 |
| JP | 2001-70647 | 3/2001 |
| JP | 2002-28369 | 1/2002 |
| JP | 2002-239251 | 8/2002 |
| JP | 3378801 | 12/2002 |

* cited by examiner (A)

96 OBJECT DISPLAY CONTROLLING PROGRAM

| NORMAL DISPLAY PROGRAM | 96a |
| STATIC DISPLAY PROGRAM | 96b |
| ERASING DISPLAY PROGRAM | 96c |

(B)

106 OBJECT DATA BUFFER AREA

| FIRST OBJECT KIND DATA | 106a |
| FIRST OBJECT POSITION DATA | 106b |
| SECOND OBJECT KIND DATA | 106c |
| SECOND OBJECT POSITION DATA | 106d |

(A) OBJECT ON CAPTURE SCREEN (B) OBJECT ON CAPTURE SCREEN

GAME APPARATUS AND STORAGE MEDIUM STORING GAME PROGRAM

FIELD

The technology herein relates to a game apparatus and a storage medium storing a game program, and, more specifically, the technology herein relates to a game apparatus and a storage medium storing a game program for playing an action game by displaying an game image including a player character and other objects.

BACKGROUND AND SUMMARY

It is well known that by capturing (making still or taking in) an image developed on one screen, an image such as still image is obtained. For example, according to a first literature entitled "A Digital Video Primer. Introduction to Digital Video" (published by Adobe Systems Co. Ltd., Adobe Dynamic Media Group on Apr. 1, 2002, on page 23), a system in which two windows are prepared on one screen, and a normal image is displayed on one window, and a captured image is displayed on the other window.

On the other hand, according to a first patent application related document, Japanese Patent Laying-open No. 2000-259134 [G09G 5/00, G06T 1/00], a technique for associating a captured image with a specific image is disclosed. The technique disclosed in this patent application is associated with a creating skill of a presentation material. By setting a link in a predetermined area of an image for making a presentation, in response to a click operation of a specific position of the image, a detailed image thereof can be viewed.

Furthermore, providing a device with a touch panel overlaying a display screen (e.g., for a PDA, a pocket computer, etc.) is well known. One example of such the device is disclosed in a second patent application related document, Japanese Patent No. 3378801 [G09G 5/14, G06F 3/00, G06F 17/22, G09G 5/00]). An information processing apparatus disclosed therein is switched to a handwriting input screen (second screen) when handwritten characters are input while a normal display screen (first screen) is displayed. The normal display screen is returned—that is, the first screen is displayed after completion of the handwritten input.

However, there is no technique that involves capturing on the other screen an image utilizing a touch panel, and applying the combination to game play. The technique disclosed in the first literature is for editing an image by use of two windows, and cannot be directly utilized for a game.

Furthermore, in the technique disclosed in the first patent application, by directing a specific position of the image, another image is displayed. Even if this is applied to the game, it is merely applicable to switching the game screens.

In addition, the technique disclosed in the second patent application is for merely switching to a screen for inputting characters, etc. by the handwritten input, (that is, the touch panel). Even if this is applied to the game apparatus, it is merely applicable to switching the game screen similar to the above-described first patent application. This is only a switching of screens without the requirement for the touch panel.

Therefore it is a primary feature of an exemplary illustrative embodiment to provide a novel game apparatus and storage medium storing a game program.

Another feature of an exemplary illustrative embodiment is to provide a game apparatus and a storage medium storing a game program capable of directing an interest of operation.

A game apparatus according to an exemplary illustrative embodiment is for playing an action game by displaying a game image including a player character and other objects, and includes a first display portion, a second display portion, a touch panel, a first image storing means, a second image storing means, an operation position detecting means, an operating means, a game processing means, a player character displaying means, an object data storing means, an object displaying means, an image capturing means, and an operation position determining means. The first display portion displays a game image. The second display portion is different from the first display portion, and displays a captured image obtained by capturing at least the game image. The touch panel is mounted in relation to the second display portion, and detects operation information. The first image storing means temporarily stores first image data corresponding to the game image. The second image storing means temporarily stores second image data corresponding to the captured image. The operation position detecting means detects a touch operation position on the basis of the operation information detected by a touch operation of the touch panel. The operating means inputs a button operation and a direction instructing operation by a player. The game processing means processes the action game according to an operation by the operating means. The player character displaying means displays the player character on the first display portion according to an operation by the operating means. The object data storing means stores object data including at least kind data and display position data as to the object. The object displaying means displays the object on the first display portion in correspondence with progress of the action game by the game processing means. The image capturing means copies and stores in the second image storing means the first image data stored in the first image storing means as second image data according to the operating means. The operation position determining means, after the first image data stored in the first image storing means is copied and stored as the second image data in the second image storing means, determining whether or not the touch operation position detected by the operation position detecting means is within a display area of the object displayed on the second display portion on the basis of the object data stored by the object data storing means. Then, the object displaying means controls display of the object on the first display portion on the basis of a determination result of the operation position determining means.

More specifically, the game apparatus (10: a reference numeral corresponding in the "preferred embodiment" described later and so forth) is for playing a game by displaying the game image (200) including the player character (202) and the other objects (204). The game image (200) is displayed on the first display portion (12). The second display portion (14) is separately provided from the first display portion, and displays the still image obtained by capturing the game image (200), that is, the captured image (210). In relation to the second display portion (14) (more specifically, formed in a laminated manner so as to cover the second display portion), touch panel (22) is provided, and the touch panel (22) detects the operation information (touch operation information) such as of which place the player touches the touch panel. The first image storing means (56) temporarily stores the first image data corresponding to the game image (200). The second image storing means (58) temporarily stores the second image data corresponding to the captured image (210). The operation position detecting means (42) detects the touch operation position on the basis of the operation information detected by the touch operation of the touch panel (22). The operating means (20) inputs the button operation (jumping operation of a character, for example) and the direction instructing operation (moving the character horizontally, for example). The game processing means (42, S3) processes an action game according to the operation of the operating means (20); the player character displaying means (42, S3) displays the player character (202) on the first display portion (12) according to the operation of the operating means (20). The object data storing means (42, 48, 72, 106, S33) stores the object data including at least kind data of the object and the display position data. That is, the game image (200) is captured. The object displaying means (42, S15) displays the object (204) on the first display portion (12) in correspondence with the progress of the action game by the game processing means (42, S3). The image capturing means (42, 50, 52, S13) copies and stores in the second image storing means (58) the first image data stored in the first image storing means (56) as the second image data according to the operation of the operating means (20). The operation position determining means (42, S47), after capturing, determines whether or not the touch operation position detected by the operation position detecting means (42) is within the display area of the object (204) displayed on the second display portion on the basis of the object data (displayed position data) stored in the object data storing means (42, 48, 72, 106, S33). The object displaying means (42, S15) controls display of the object (204) on the first display portion (12) on the basis of the determination result by the operation position determining means (42, S47).

According to an exemplary illustrative embodiment, a content of the operation of the captured image displayed on the second display portion by use of the touch panel is reflected on the game image displayed on the first display portion (that is, the game play), and a novel game operation can be realized.

In one exemplary illustrative embodiment of this invention, the object displaying means displays in a static manner the object corresponding to the display area on the first display portion when a determination result by the operation position determining means shows within the display area. More specifically, the object displaying means (42, S15) displays in a static manner the object corresponding to the display area on the first display portion (12) when a determination result by the operation position determining means (42, S47) shows within the display area. That is, a content of the operation of the captured image displayed on the second display portion (14) by use of the touch panel (22) is reflected on the game play. That is, by touching (directing) the object displayed on the second display portion, it becomes possible to display the object in a static manner in the first display portion. For example, when a player finds it difficult to play the game due to a heavy attack from the enemy character, by performing a capture operation such as depressing (directing) an obstructive enemy character via the touch panel, the enemy character on the game image is frozen. This allows the player to realize clear a game by the capture operation, and to feel a novel sense of operation.

In one aspect of an exemplary illustrative embodiment, the game apparatus further comprises an operation position storing means for storing the touch operation position detected by the operation position detecting means when a determination result by the operation position determining means shows up within the display area; and a comparing means for comparing a current touch operation position and a previous touch operation position that are stored by the operation position storing means; wherein the object displaying means displays in a static manner the object corresponding to the display area on the first display portion when a comparison result of the comparing means shows a coincidence, and displays in an incomplete manner the object corresponding to the display area on the first display portion such that a portion equal to a line segment connecting at least the previous touch operation position and the current touch operation position is incomplete when the comparison result by the comparing means shows inconsistency.

More specifically, the game apparatus (10) further comprising an operation position storing means (42, 110, S45) and a comparing means (42, S49). The operation position storing means (42, 110, S45) stores the touch operation position detected by the operation position detecting means (42) when a determination result by the operation position determining means (42, S47) shows within a display area. The comparing means (42, S49) compares the current touch operation position and the previous touch operation position that are stored in the operation position storing means (42, 110, S45). The object displaying means (42, S15) displays in a static manner the object (204) corresponding to the display area on the first display portion (12) when the comparison result by the comparing means (42, S49) shows coincidence ("NO" in S51). On the other hand, when the comparison result by the comparing means (42, S49) shows inconsistency ("YES" in S51), the object (204) corresponding to the display area is displayed in an incomplete manner on the first display portion (12) such that the portion equal to the line segment connecting at least the previous touch operation position and the current touch operation position is incomplete. It is noted that the object (204) can be entirely erased. Thus, by operating the object displayed on the second display portion with the use of the touch panel, the object displayed on the first display portion can be frozen, erased, and so forth. This allows the player to feel a novel sense of operation, and the enjoyment of the game can be improved.

Another exemplary illustrative embodiment, wherein the object data storing means stores the object data respectively corresponding to a plurality of kinds of the objects, further comprises an object kind specifying means for specifying a kind of the object on the basis of the object data of the object that is determine to be within the display area by the operation position determining means; wherein the object displaying means controls display of the object with the kind specified by the object kind specifying means on the first display portion. More specifically, the object data storing means (42, 48, 72, 106, S33) stores the object data respectively corresponding to the plurality of kinds of the objects. The object kind specifying means (42) specifies the kind of the object (204) on the basis of the object data (kind data) of the object (204) that is determined to be within display area ("YES" in S47) by the operation position determining means (42, S47). The object displaying means (42, S15) controls display of the object with the kind specified by the object kind specifying means (42). Thus, in a case where the plurality of kinds of enemy characters exist, the player has to select which enemy character is to be frozen, and a strategy for the game can be required.

In another aspect of an exemplary illustrative embodiment, a capturable number of times storing means for storing a limited number of times of copying of the first image data by the image capturing means; a counting means for counting the number of times of copying of the first image data by the image capturing means; and an inactivating means for inactivating the image capturing means when the number of times of copying is above the capturable number of times are provided. More specifically, the capturable number of times storing means (48, 72) stores the limited number of times of copying of the first image data by the image capturing means (42, 50, 52, S13). The counting means (42, S11) counts the number of times of copying of the first image data by the image capturing means (42, 50, 52, S13). The inactivating means (42) inactivates the image capturing means (42, 50, 52, S13) when the number of times of copying is above the capturable number of times ("NO" in S7). That is, the capturing is hampered. Thus, the capture operation is limited, and therefore, it is possible to specify that the game cannot be progressed with a simple operation only. That is, in a case of performing the capture operation also, the player has to think about the strategy, and the enjoyment of the game can be improved.

A storage medium stores a game program according to an exemplary illustrative embodiment, and the game program is executed by the game apparatus. The game apparatus is for playing an action game by displaying a game image including a player character and other objects, and includes a first display portion, a second display portion, a touch panel, a first image storing means, a second image storing means, and an operating means. The first display portion displays the game image. The second display portion is different from the first display portion, and displays a captured image obtained by capturing at least the game image. The touch panel is mounted in relation to the second display portion, and detects the operation information. The first image storing means temporarily stores first image data corresponding to the game image. The second image storing means temporarily stores second image data corresponding to the captured image. Then, the operating means inputs the button operation and the direction instructing operation by the player.

The game program causes a processor of the game apparatus to execute an operation position detecting step, a game processing step, a player character displaying step, an object displaying step, an image capturing step, an object data storing step, and an operation position determining step. The operation position detecting step detects the touch operation position on the basis of the operation information detected by the touch operation of the touch panel. The game processing step processes the action game according to the operation of the operating means. The player character displaying step displays the player character on the first display portion according to the operating means. The object displaying step displays the object on the first display portion in correspondence with progress of the action game by the game processing step. The image capturing step copies and stores in the second image storing means the first image data stored in the first image storing means as second image data according to the operation of the operating means. The object data storing step stores object data including at least kind data and display position data as to the object when the first image data stored in the first image storing means is copied as the second image data in the second image storing means. The operation position determining step, after the first image data stored in the first image storing means is copied and stored as the second image data in the second image storing means, determines whether or not the touch operation position detected by the operation position detecting step is within a display area of the object displayed on the second display portion on the basis of the object data stored by the object data storing step. Then, the object displaying step controls display of the object on the first display portion on the basis of a determination result of the operation position determining step.

In the storage medium of an exemplary illustrative embodiment also, similar to the above-described game apparatus, a content of the operation of the captured image displayed on the second display portion by use of the touch panel is reflected on the game image displayed on the first display portion, that is, the game play, and therefore, a novel game operation can be realized.

BRIEF DESCRIPTION OF THE DRAWINGS

These and other features and advantages will be better and more completely understood by reference to the following detailed description of exemplary illustrative embodiments in conjunction with the drawings of which.

DETAILED DESCRIPTION

Figure 1:
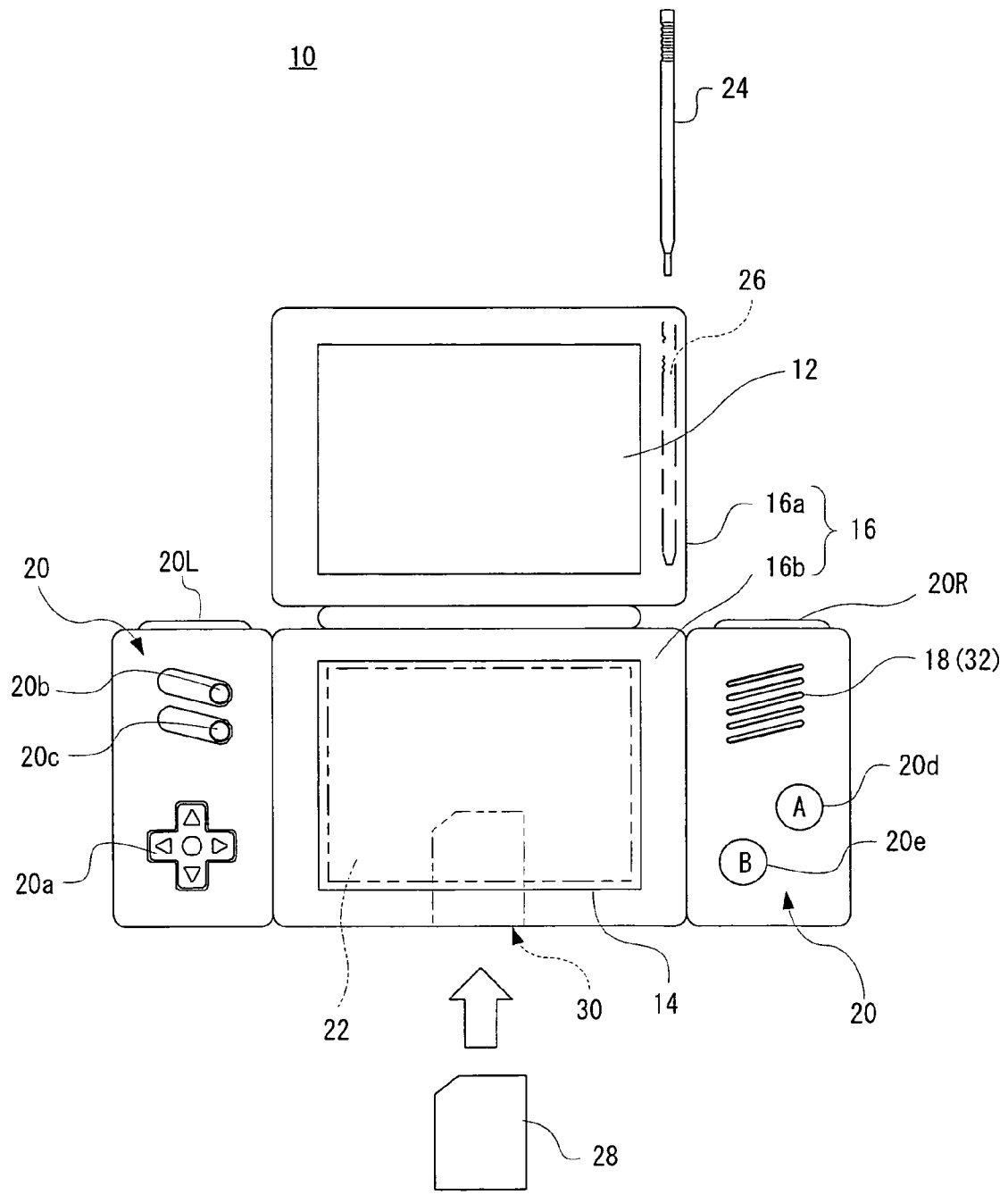
FIG. 1 is an illustrative view showing one exemplary illustrative game apparatus.

Referring to FIG. 1, a game apparatus 10 of one exemplary illustrative embodiment includes a first liquid crystal display (LCD) 12 and a second LCD 14. The LCD 12 and the LCD 14 are provided on a housing 16 so as to be arranged in a predetermined position. In this exemplary illustrative embodiment, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this exemplary illustrative embodiment, an EL (Electronic Luminescence) display and a plasma display may be used in place of the LCD.

As can be understood from FIG. 1, the upper housing 16a has a plane shape a little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at approximately the center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating any one of four depression portions. The start switch 20b is formed by a push button, and is utilized for starting (restarting), temporarily stopping (pausing) a game, and so forth. The select switch 20c is formed by the push button, and utilized for a game mode selection, etc.

The action switch 20d (that is, the A button) is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e (that is, the B button) is formed by the push button, and is utilized for changing a game mode selected by the select switch 20c, canceling an action determined by the A button 20d, and so forth.

The action switch (left depression button) 20L and the action switch (right depression button) 20R are formed by the push button, and the left depression button (L button) 20L and the right depression button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any kind of resistance film system, optical system (infrared rays 5 system) and electrostatic capacitive coupling system, for example, can be utilized. In response to an operation by depressing, stroking (touching), and so forth with a stylus 24, a pen (stylus pen), or a finger (hereinafter, referred to as "stylus 24, etc.") on a top surface of the touch panel 22, the touch panel 22 detects a coordinate position of the stylus 24, etc. to output coordinates position data.

It is noted that in this exemplary illustrative embodiment, a resolution of the display surface of the LCD 14 is 256 dots× 192 dots, and a detection accuracy of a detection surface of the touch panel 22 is also rendered 256 dots×192 dots in correspondence to the resolution of the display surface (this is true for the LCD 12). However, the detection accuracy of the detection surface of the touch panel 22 may be lower or higher than the resolution of the display surface.

Mainly, a normal game screen (motion image) is displayed on the LCD 12, and a game screen (still image) obtained by capturing the normal game screen is displayed on the LCD 14 in this exemplary illustrative embodiment. Here, the game screen to be displayed on the LCD 14 is a still image (one frame of image) of the normal game screen at a time that the player inputs a capturing instruction. Hereinafter, in the interest of simplicity, a screen to be displayed on the LCD 12 is called a "game screen", and a screen to be displayed on the LCD 14 is called a "capture screen".

It is noted that in a case where the capture screen is not displayed, the LCD 14 can display texture information, icons, etc. Accordingly, the player is able to, for example, select a command indicated by the texture information, the icon, etc. displayed on the display screen of the LCD 14, instruct a scrolling (gradual moving display) direction of the game screen (map) displayed on the LCD 12, and so forth by operating the touch panel 22 with the use of the stylus 24, etc. Furthermore, depending on the kind of the game, the player is able to use the LCD 14 for another various input instructions, such as selecting or operating the icon displayed on the LCD 14, instructing a coordinates input, and so forth.

Thus, the game apparatus 10 has the LCD 12 and the LCD 14 as a display portion of two screens, and by providing the touch panel 22 on an upper surface of any one of them (LCD 14 in this exemplary illustrative embodiment), the game apparatus 10 has the two screens (LCD 12, 14) and the operating portions (20,22) on which different operation inputs of two systems is performed.

Furthermore, in this exemplary illustrative embodiment, the stylus 24 can be inserted into a housing portion (housing slot) 26 provided in proximity to a side surface (right side surface) of the upper housing 16a, for example, and taken out therefrom as necessary. It is noted that in without stylus 24, it is not necessary to provide the housing portion 26.

Also, the game apparatus 10 includes a memory card (or game cartridge) 28, and the memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It is noted that although not illustrated in FIG. 1, a speaker 32 (see FIG. 2) is provided at a position corresponding to the sound hole 18 inside the lower housing 16*b*.

Furthermore although omitted in FIG. 1, for example, a battery accommodating box is provided on a rear surface of the lower housing 16*b*, and a power switch, a volume switch, an external expansion connector, an earphone jack, etc. are provided on a bottom surface of the lower housing 16*b*.

Figure 2:
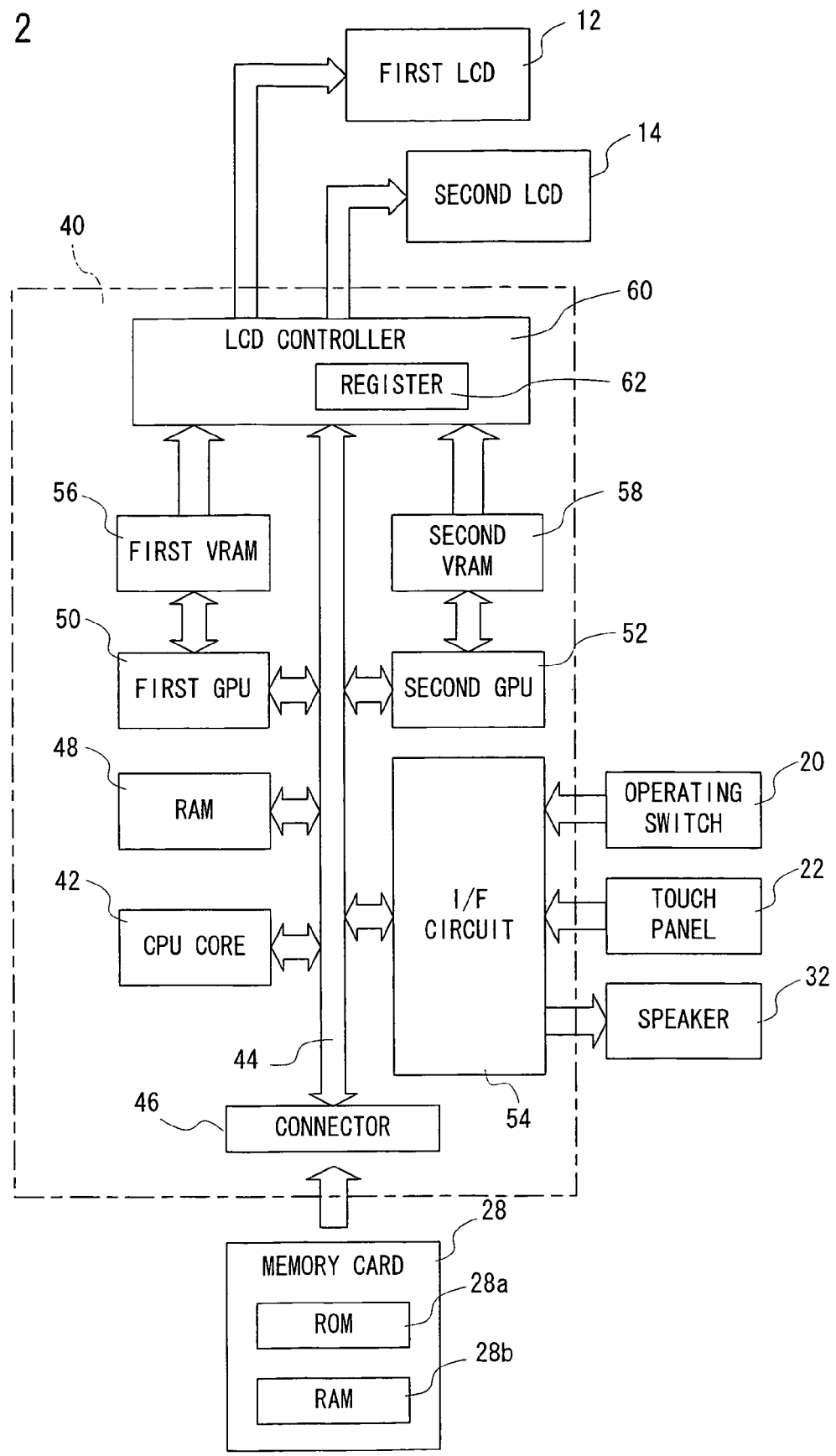
FIG. 2 is a block diagram of an electric configuration of the game apparatus shown in FIG. 1.

FIG. 2 is a block diagram showing an electric configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28*a* and a RAM 28*b*, and although illustration is omitted, the ROM 28*a* and the RAM 28*b* are connected with each other via a bus and also connected with a connector (not shown) to be connected with the connector 46. Accordingly, the CPU core 42 gains access to the ROM 28*a* and the RAM 28*b* as described above.

The ROM 28*a* stores in advance a game program for a game (virtual game) to be executed by the game apparatus 10, image (character image, background image, item image, message image, etc.) data, data of the sound (music) necessary for the game (sound data), etc. The RAM (backup RAM) 28*b* stores (saves) proceeding data and result data of the game.

The RAM 48 is utilized as a buffer memory or a working memory. That is, the CPU core 42 loads the game program, the image data, the sound data, etc. stored in the ROM 28*a* of the memory card 28 into the RAM 48, and executes the loaded game program. The CPU core 42 executes a game process while storing in the RAM 48 data (game data and flag data) temporarily generated in correspondence with a progress of the game.

It is noted that each of the game program, the image data, the sound data, etc, are loaded from the ROM 28*a* entirely at a time, or partially and sequentially, so as to be stored (loaded) into the RAM 48.

Each of the GPU 50 and the GPU 52 forms a part of a rendering means, which is constructed by, for example, a single chip ASIC, and receives a graphics command (construction command) from the CPU core 42 to generate data (screen data) of the game image (game screen) according to the graphics command. However, the CPU core 42 applies to each of the GPU 50 and the GPU 52 an image generating program (included in the game program) in addition to the graphics command.

It is noted that each of the GPU 50 and the GPU 52 gains access to the RAM 48 to fetch data (image data: data such as polygon, texture, etc.) required for executing a construction command by the GPU 50 and the GPU 52.

Furthermore, the GPU 50 is connected with a first video RAM (hereinafter, referred to as "VRAM") 56, and the GPU 52 is connected with a second VRAM 58. The GPU 50 renders the created game image data in the VRAM 56, and the GPU 52 renders the created screen data in the VRAM 58.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. The LCD controller 60 outputs the screen data rendered in the VRAM 56 to the LCD 12, and outputs the screen data rendered in the VRAM 58 to the LCD 14 in a case that the data value of the register 62 is "0". Furthermore, the LCD controller 60 outputs the screen data rendered in the VRAM 56 to the LCD 14, and outputs the screen data rendered in the VRAM 58 to the LCD 12 in a case that the data value of the register 62 is "1". It is noted that in the interests of simplicity, "0" is constantly stored in the register 62 in this exemplary illustrative embodiment.

The I/F circuit 54 is connected with the operating switch 20, the touch panel 22 and the speaker 32. Here, the operating switch 20 is the above-described switches 20*a*, 20*b*, 20*c*, 20*d*, 20*e*, 20L and 20R, and in response to an operation of the operating switch 20, a corresponding operation signal (operation data) is input to the CPU core 42 via the I/F circuit 54. Furthermore, the coordinate position data from the touch panel 22 is input to the CPU core 42 via the I/F circuit 54. In addition, the CPU core 42 reads-out the sound data necessary for the game such as a game music (BGM), a sound effect or voices of a game character (onomatopoeic sound), etc. from the RAM 48, and outputs it from the speaker 32 via the I/F circuit 54.

Figure 3:
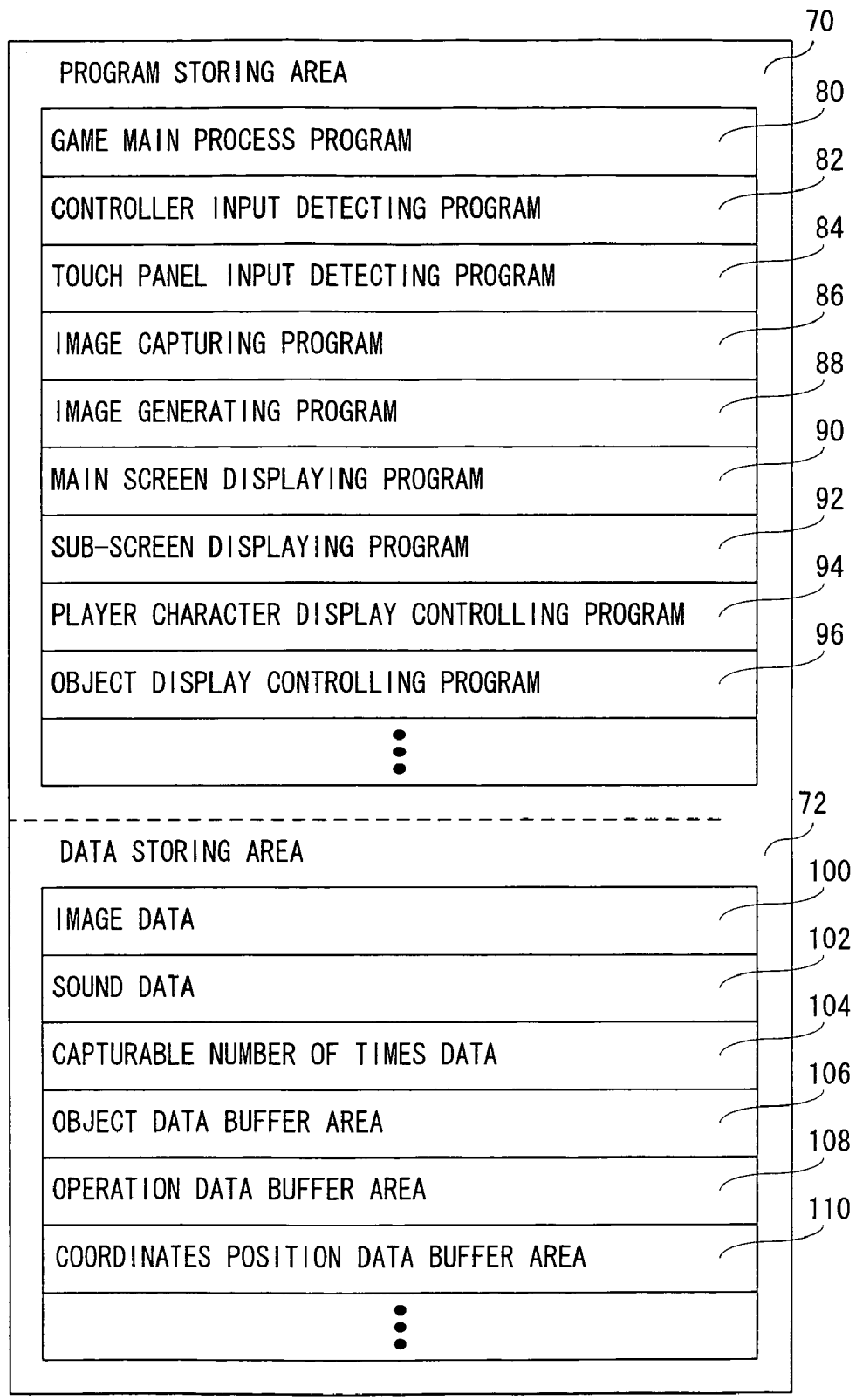
FIG. 3 is an illustrative view showing a memory map of a RAM (working memory) of the game apparatus shown in FIG. 2.

FIG. 3 is an illustrative view showing one example of a memory map of the RAM 48. As shown in FIG. 3, the RAM 48 includes a program storing area 70 and a data storing area 72. In the program storing area 70, a game program is stored, and the game program consists of a game main process program 80, a controller input detecting program 82, a touch panel input detecting program 84, an image capturing program 86, an image generating program 88, a main screen displaying program 90, a sub-screen displaying program 92, a player character display controlling program 94, and an object display controlling program 96, etc.

The game main process program 80 is a program for executing a game main process of a virtual game. The controller input detecting program 82 is a program for detecting operation data input from the controller, that is, the operating switch 20, and writing the detected operation data to the data storing area 72. The touch panel input detecting program 84 is a program for detecting coordinate position data input from the touch panel 22, and writing the detected coordinates position data to the data storing area 72.

The image capturing program 86 is a program for capturing a game screen 5 according to an operation by the player. Specifically, since the data value "0" is constantly stored in the register 62, in response to an instruction of capturing by the player, the CPU core 42 duplicates (copies) in the VRAM 58 the screen data created in the VRAM 56. More specifically, the GPU 52 reads the screen data rendered in the VRAM 56 via the GPU 50 according to the instruction from the CPU core 42, and writes it to the VRAM 58. Accordingly, the screen data rendered in the VRAM 56 is duplicated in the VRAM 58. Thereafter, as described later, the screen data written in the VRAM 56 and the VRAM 58 is read by the LCD controller 60 to display the game screen on the LCD 12 and the capture screen on the LCD 14.

The image generating program 88 is a program for generating a game image (player character image, object image). The image generating program 88 is applied to each of the GPU 50 and the GPU 52 by the CPU core 42, and the GPU 50 and the GPU 52 respectively generate the screen data in the VRAM 56 and the VRAM 58 according to the image generating program 88.

The main screen displaying program 90 is a program for applying a display command to the LCD controller 60 in a case of displaying the main screen, that is, the game screen. The sub-screen displaying program 92 is a program for applying a display command to the LCD controller 60 in a case where displaying a sub-screen (mainly, capture screen in this exemplary illustrative embodiment). Accordingly, in a case where the data value of the register 62 is "0", when the CPU core 42 applies a display command to the LCD controller 60 according to the main screen displaying program 88, the LCD controller 60, in response thereto, reads the screen data generated in the VRAM 56 and outputs it to the LCD 12. In addition, when the CPU core 42 applies a display command to the LCD controller 60 according to the sub-screen displaying program 90, the LCD controller 60, in response thereto, reads the screen data generated (duplicated) in the VRAM 58, and outputs it to the LCD 14.

The player character display controlling program 94 is a program for controlling a display of the player character on the game screen according to an operation by the player. The object display controlling program 96 is a program for controlling a display of the object on the game screen. Here, the object means characters or objects except for the player character, and specifically is equal to an enemy object, an item object, a background object (wall, floor (ground), door, steps, block, building, tree, etc.), and the like.

Figure 4:
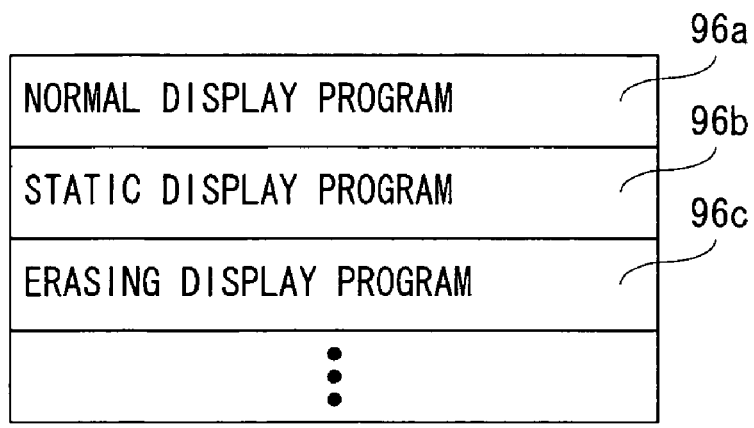
FIG. 4 is an illustrative view showing a configuration of an object displaying program and a content of an object data buffer area shown in FIG. 3.
Figure 4:
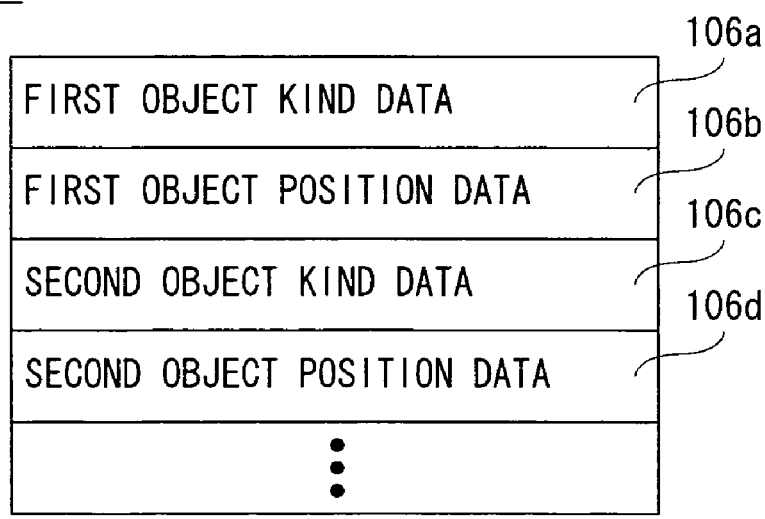

The object display controlling program 96 consists of, as shown in FIG. 4 (A), a normal display program 96a, a static display program 96b, an erasing display program 96c, etc. The normal display program 96a is a program for controlling a display of the object according to a movement, etc. determined in advance independent of the operation by the player. The static display program 96b is a program for, in a case that the player indicates (specifies) an object displayed on the capture screen by operating the touch panel 22, displaying the object displayed on the game screen in a static manner. The erasing display program 96c is a program, in a case that the player strokes (rubs) the object displayed on the capture screen displayed by operating the touch panel 22, displaying the object displayed on the game screen in an erasing manner (erasing display). In this exemplary illustrative embodiment, in a case where an object I displayed in an erasing manner, the object on the game screen is displayed such that a part corresponding to the portion stroked according to an operation of the touch panel 22 by the player is incomplete (scratched out). It is noted that in a case that a stroke operation is present, an entire object may be scratched out. In this case, the object may simply be erased from the game screen, or the object may be displayed so as to be bounced off in order to direct an erasing manner of the object. Furthermore, such the erasing display is in various ways. Not only a stroked portion is incomplete, but also the portion can be erased with boldface, and in a case that the stroked portion forms a closed region, the closed range can also be erased.

It is noted that although illustration is omitted, in the program storing area 70, a sound outputting program, a backup program, etc. are stored. In brief, the sound output program is for reading sound data 102 stored in the data storing area 72 to output from the speaker 32 a sound necessary for the game such as a sound effect, a game music (BGM), a voices or a onomatopoeic sound of the characters via the I/F circuit 54. The backup program stores (saves) in the RAM 28b as a backup memory the game data (proceeding data or result data) generated during the game automatically or according to an instruction from the player.

Returning to FIG. 3, in the data storing area 72, image data 100, the sound data 102 and capturable number of times data (capture limited number of times data) 104 are stored, and an object data buffer area 106, an operation data buffer area 108 and a coordinates position data buffer area 110 are provided.

The image data 100 is data necessary for generating images of a player character and objects (data such as polygon data, texture data, etc.), icon image data, message image data, etc. The sound data 102 is, as described above, data for outputting a sound (music) necessary for the game. The capturable number of times data 104 is data indicative of the capturable number of times of the game screen, and consists of a register (counter). At a start of the game, a default value is set to the counter, and every time that a screen is captured, the counter is decremented, and when the count value of the counter becomes "0", it becomes impossible to capture a screen. It is noted that as the default value, a value according to the level of the player character or the level of the game is set to the counter, or in a case of starting the game from a place where a player previously quits, the capturable number of times included in the stored (saved) game data is set to the counter. Furthermore, the counter is incremented according to generation of a predetermined event, defeat of a predetermined enemy object, obtainment of a predetermined item, etc. That is, the capturable number of times is increased. Furthermore, in a case that where the level of the player character is increased during the game, the counter may be incremented or decremented. Thus, there are various methods of increasing or decreasing the capturable number of times except for a capture operation, and this is an item arbitrarily set by a programmer or a developer.

The object data buffer area 106 temporarily stores data (object data) relating to the object to be displayed on the game screen when a capture operation by the player is present. The object data includes data indicative of a kind (identification information such as a label) of the object (object kind data) and data indicative of a position of the object (object position data) as shown in FIG. 4 (B). In FIG. 4 (B) example, in the object data buffer area 106, first object kind data 106a is stored, and corresponding thereto, first object position data 106b is stored. In addition, second object kind data 106c is stored, and corresponding thereto, second object position data 106d is stored. Furthermore, although illustration is omitted, object data of another kind of object is also stored. The object position data (106b, 106d, ... ) is, strictly speaking, data collection of the position coordinates corresponding to each dot existing in the display area of the object displayed on the LCD 12 at a time of being captured.

It is noted that as described above, the object includes the enemy object, the item object, the background object, etc. However, the object data to be stored is the object data as to the enemy object displayed on the game screen. This is because when the player directs (depresses or touches) the enemy object on the capture screen as described later, the enemy object on the game screen is frozen, and when the player strokes (rubs) the enemy character on the capture screen, the enemy object on the game screen is erased. Thus, the player character can progress in a traveling direction without fighting with the enemy object as an obstacle of proceeding while avoiding it.

It is noted that for simplicity that, although the object data as to the enemy object is stored in this exemplary illustrative embodiment as the object data as an obstacle of the progress of the player object like the enemy object, the object data as to the background object such as a wall, a door, a block, etc. may be stored.

Figure 13:
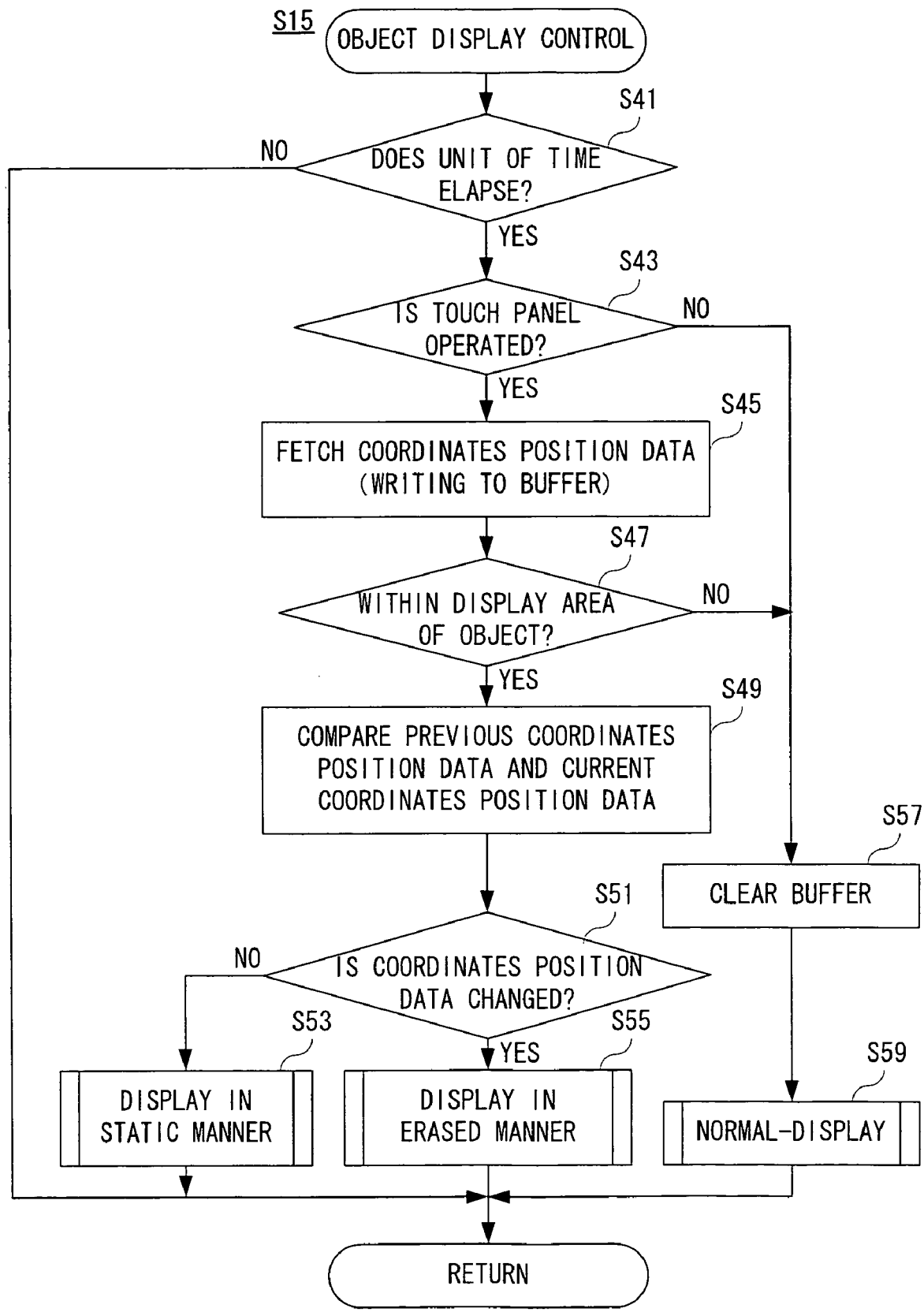
FIG. 13 is a flowchart showing an object display controlling process of the CPU core shown in FIG. 2.

Returning to FIG. 3, the operation data buffer area 108 temporarily stores the operation data detected by the CPU core 42 according to the controller input detecting program 82. For example, the CPU core 42 executes a game process in correspondence to the operation data stored in the operation data buffer area 108, and then, clears the operation data buffer area 108. The coordinate position data buffer area 110 temporarily stores the coordinates position data detected by the CPU core 42 according to the touch panel input detecting program 84. In this exemplary illustrative embodiment, at least two coordinate position data (coordinates position data detected immediately before and coordinate position data currently detected) are stored, and utilized mainly in an object display controlling process (FIG. 13). Although described in detail later, the CPU core 42 clears the coordinates position data buffer area 10 in a case where the coordinate position data is not detected during the object display controlling process, or in a case where the coordinates position data is detected but the position indicated by the coordinates position data is out of the display area of the predetermined object (enemy object). However, three or more coordinate position data may be stored.

It is noted that although illustration is omitted, in the data storing area 72, other game data (including a flag and a counter) generated in correspondence with the progress of the game is also stored.

For example, in the game apparatus 10 of this exemplary illustrative embodiment, it is possible to enjoy an action game. In the general action game and the action RPG, the player character moves on a map (stage) according to an operation by the player, defeats the various enemy objects, and clears each stage to attain a final purpose. In a case where a player plays such an action game in the conventional game apparatus, the player controls movement of the player character by operating the operating switch or the operation button provided on the game apparatus, and advances the game by fighting with the enemy object, and so forth. Furthermore, by utilizing a specific item, defeating an enemy object of a specific kind or specific level, and so forth, a predetermined condition is satisfied to open and move a door, a wall, a block as a hindrance of progress of the game, and whereby, the player character is moved in the traveling direction.

However, in the action game utilizing the conventional game apparatus, only when defeating the enemy object, satisfying the predetermined condition, and so forth, the game is progressed, and the enjoyment of the game depends on a game character, a design of the object or a story of the game, and lacking in an interest of game operation itself.

Here, in this exemplary illustrative embodiment, after capturing the game screen displayed on the LCD 12, the capture screen is displayed on the LCD 14, and a content of the operation on the touch panel 22 placed on the LCD 14 is reflected on the game screen (game play). That is, a novel game operation is possible.

Figure 5:
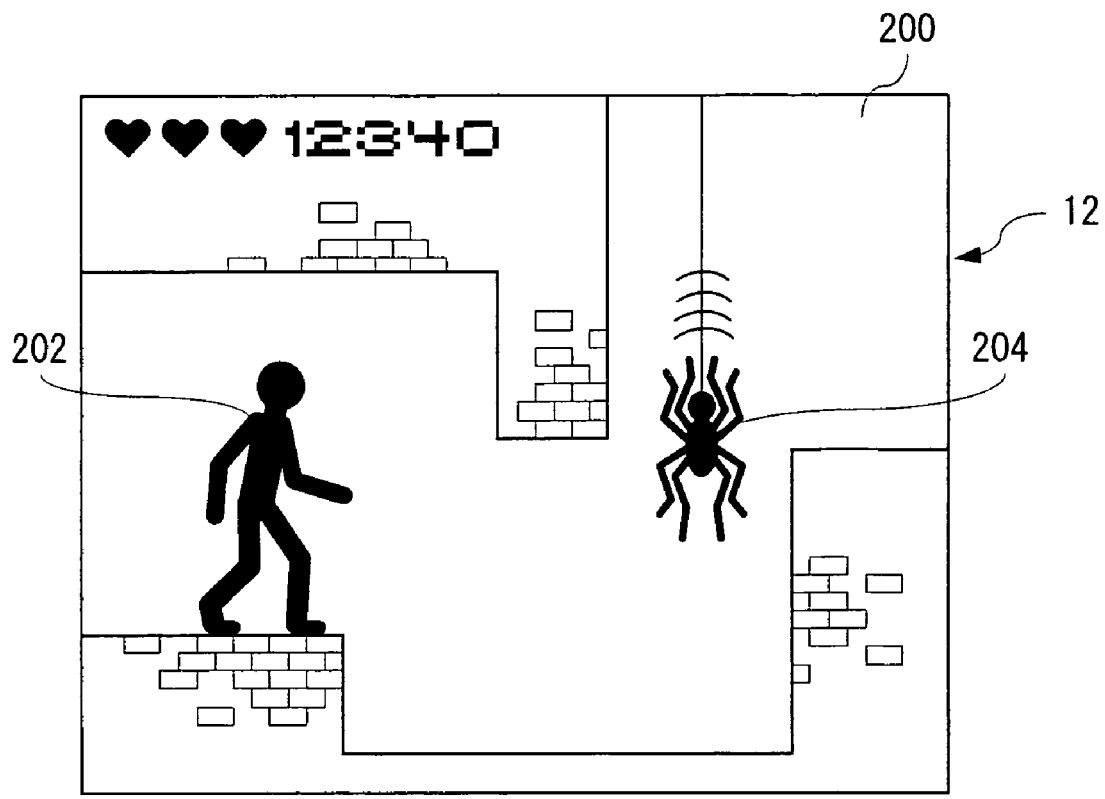
FIG. 5 is an illustrative view showing one example of a screen to be displayed on an LCD shown in FIG. 1 and FIG. 2.
Figure 5:
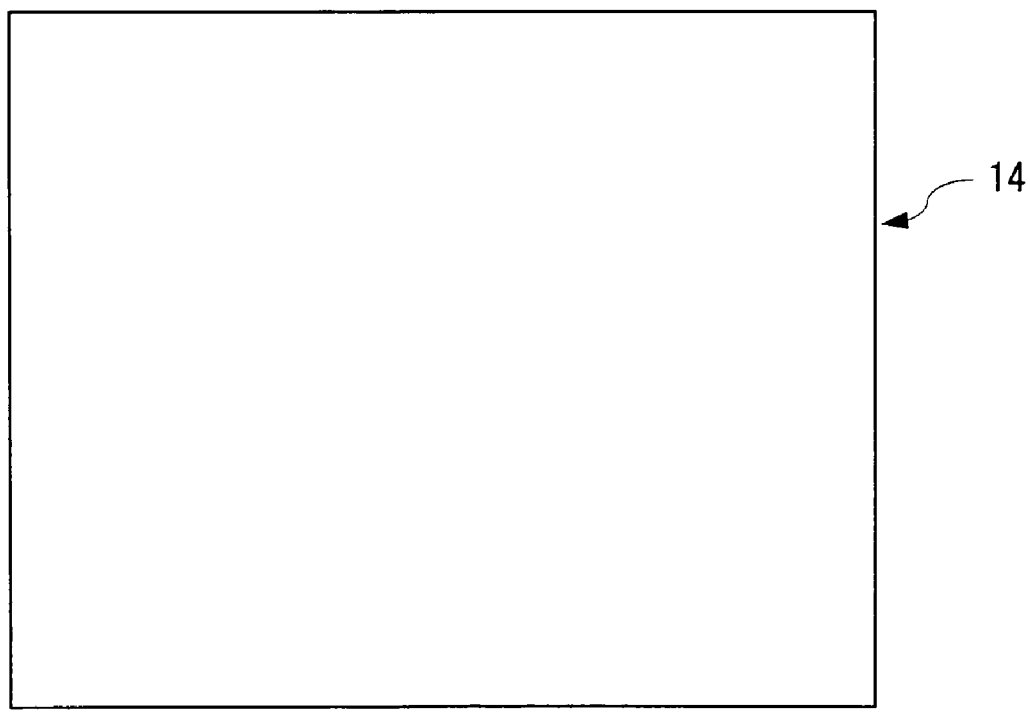

FIG. 5 is an illustrative view showing the screens displayed on the LCD 12 and the LCD 14. In FIG. 5, on the LCD 12, a game screen 200 is displayed, and on the LCD 14, no image is displayed. The game screen 200 displays a part of the course in a certain stage as a background image, a player character 202 moving on the course, and an enemy object 204 that is arranged on the course and hinders the progress of the player character 202 (progress in the right). The enemy object 204 is an object (character) imitating a spider, for example, that repeatedly moves up and down by lengthening or shortening a wire extended from the ceiling. Accordingly, the player controls a movement of the player character 202 by operating the operating switch 20 to allow the player character to advance in the right direction by defeating the enemy object 204, passing through while the enemy object 204 moves upward, and so forth.

Figure 6:
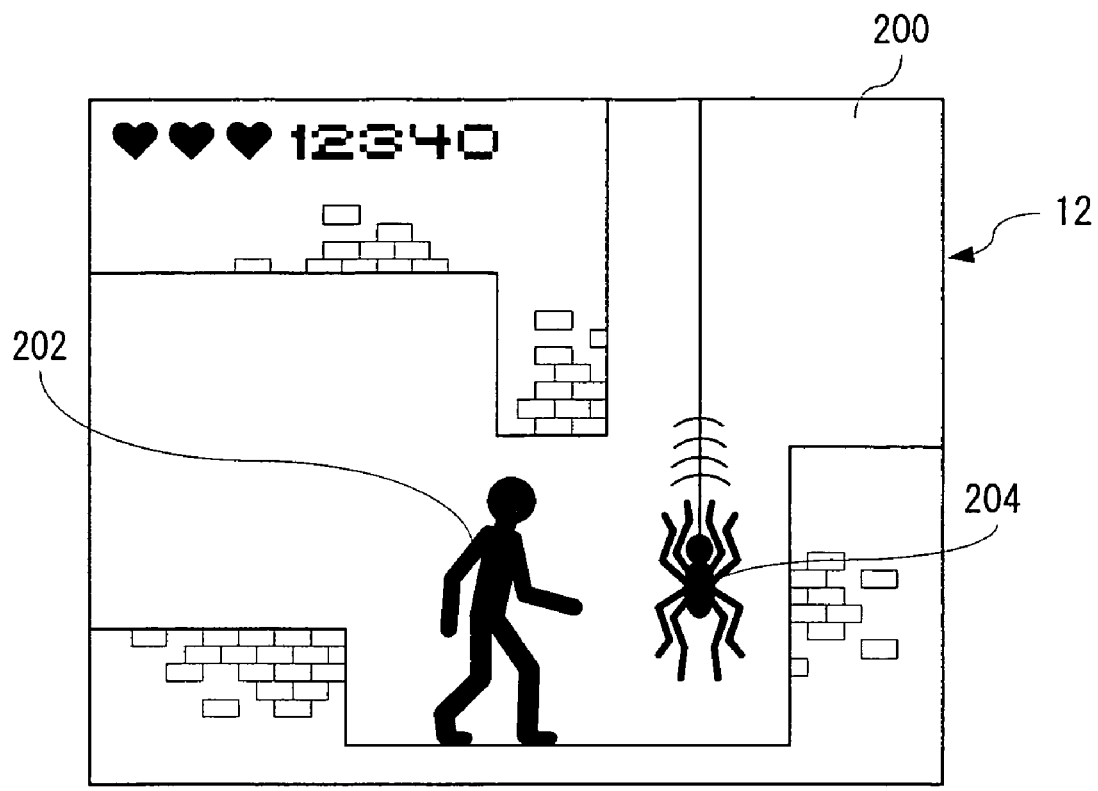
FIG. 6 is an illustrative view showing another example of a screen to be displayed on the LCD shown in FIG. 1 and FIG. 2.
Figure 6:
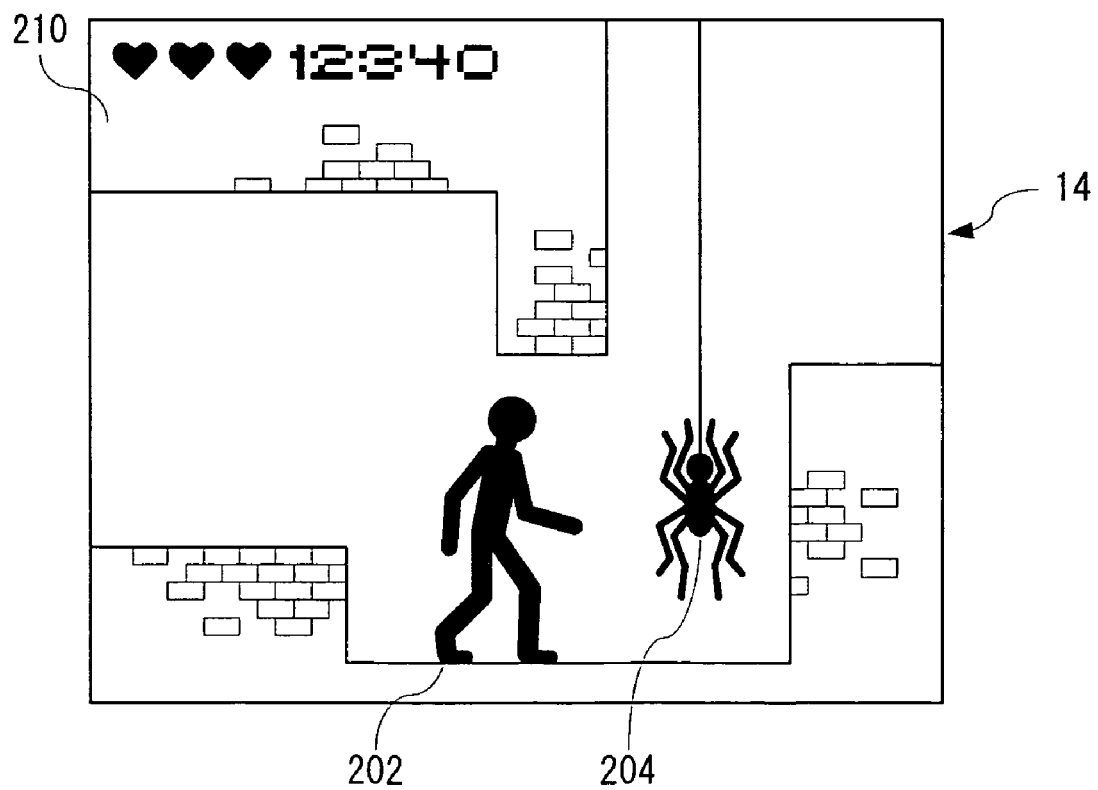

Furthermore, when the player inputs a capture operation in such the condition, a copy of the game screen 200 at a time that the capture operation is input is displayed as a capture screen 210 on the LCD 14 as shown in FIG. 6. More specifically, in response to an input of an operation signal (operation data) by the capture operation from the operating switch 20 (L button 20L or R button 20R), the CPU core 42 reads out the screen data in the VRAM 56 via the GPU 50, and writes the read screen data to the VRAM 58 by controlling the GPU 52. That is, the screen data of the VRAM 56 is copied in the VRAM 58. Furthermore, at this time, the object data (kind data and object position data) as to the enemy object 204 displayed on the LCD 12 (game screen 200) is stored (temporarily stored) in the RAM 48.

It is noted that the game screen 200 shown in FIG. 6 is the same as the game screen 200 shown in FIG. 5 except that the player character 202 slightly proceeds in the right direction.

Figure 7:
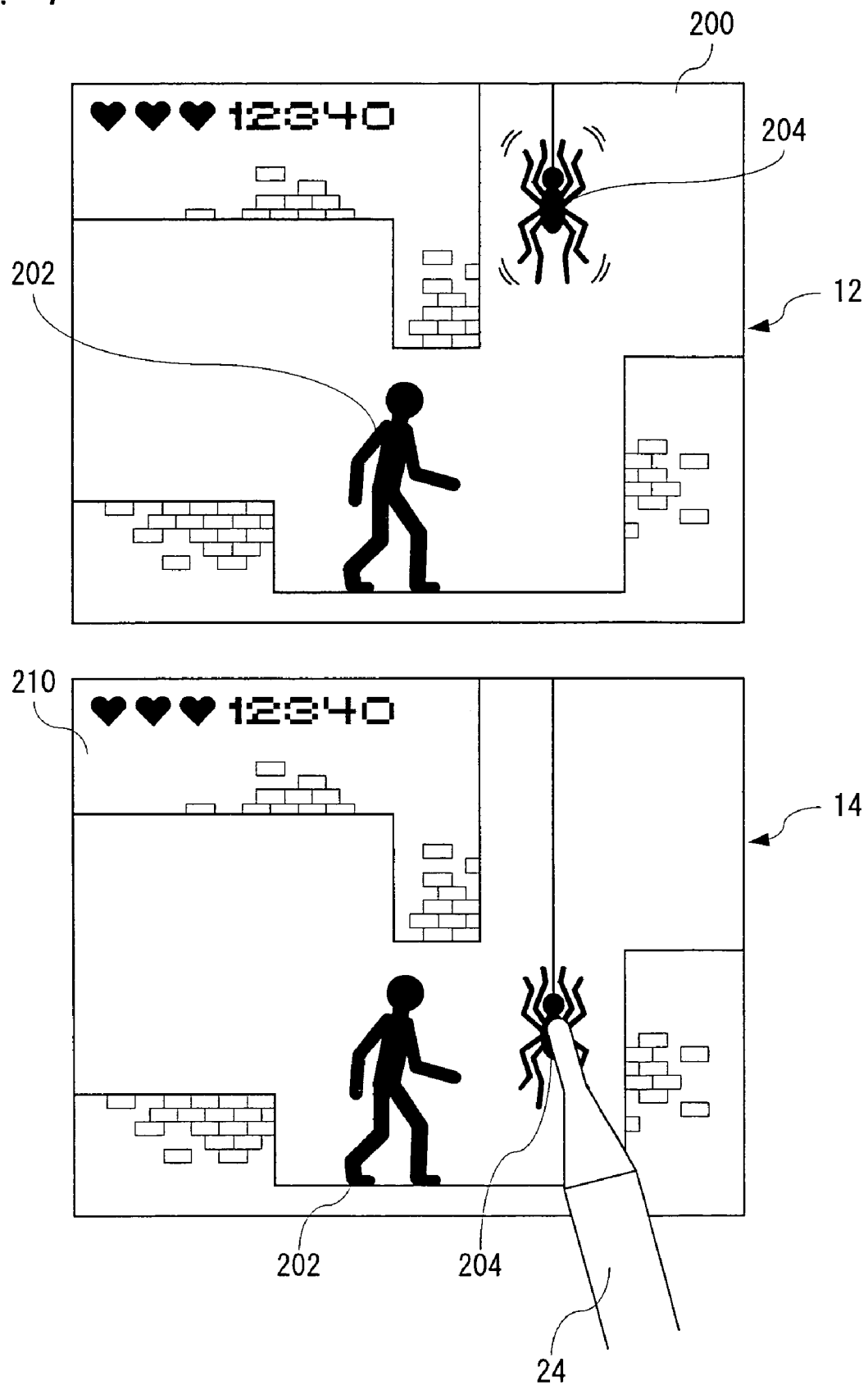
FIG. 7 is an illustrative view showing the other example of a screen to be displayed on the LCD shown in FIG. 1 and FIG. 2.

Here, as shown in FIG. 7, when the player depresses (indicates) the enemy object 204 displayed on the LCD 14 (capture screen 210) with a stylus 24 (finger is possible, and hereinafter, the same as above), the enemy object 204 displayed on the LCD 12 (game screen 200) is frozen. In the FIG. 7 example, when the enemy object 204 on the game screen 200 moves upward, the enemy object 204 on the capture screen 210 is directed, and then, the enemy object 204 is frozen on the game screen 200.

More specifically, the CPU core 42 fetches the coordinate position data from the touch panel 22, and writes it to the coordinates position data buffer 110 of the RAM 48. Next, the coordinates position data written to the RAM 48 and the object position data included in the object data 106 are compared with each other to determine whether or not object position data matching with the coordinates position data is present. That is, it is determined whether or not the player directs (depresses) the object (enemy object 204).

In a case where the object position data matching with the coordinates position data is absent, the CPU core 42 determines that the enemy object 204 is not directed, clears the coordinate position data buffer area 110, and controls the GPU 50 such that the enemy object 204 is displayed on the LCD 12 according to the normal display program 96a. On the other hand, in a case where the object position data matching with the coordinate position data is present, the CPU core 42 specifies the kind of the enemy object 204 from the object kind data stored in correspondence to the object position data, and controls the GPU 50 such that the specified enemy object 204 is displayed in a static manner on the LCD 12. That is, the CPU core 42 controls the GPU 50 such that the image data corresponding to the enemy object 204 is not updated in the VRAM 56. Thus, the enemy object 204 is frozen on the game screen 200.

It is noted that, as described later, in order to distinguish from an erasing display of the enemy object 204, in a case where the object position data matching with the coordinate position data is present, the previous coordinate position data and the current coordinate position data are compared to determines whether to display in a static manner or in an erasing manner, depending on the comparison result. More specifically, in a case where the previous coordinate position data and the current coordinate position data are coincident with each other, by determining that the player simply directs the enemy object 204 on the capture screen 210, the enemy object 204 displayed on the game screen 200 is frozen. On the other hand, in a case where the previous coordinate position data and the current coordinate position data are not coincident with each other, by determining that the player does not direct the enemy object 204 on the capture screen 210 but strokes the enemy object 204, the enemy object 204 on the game screen 200 is displayed in an erasing manner.

In this exemplary illustrative embodiment, for simplicity, an example in which one enemy object 204 of one kind is displayed on the game screen (capture screen also) is shown. However, in some cases, a plurality of enemy objects 204 of the same or different kind may be displayed. Accordingly, in such the case, the player not only displays in a static manner (this is true for the erasing display) the enemy object 204 directed on the LCD 14 (capture screen 210) but also displays in a static manner all the enemy objects 204 of the same kind. Therefore, in a case where the plurality of kinds of enemy objects 204 exist, it is possible for the player to reflect a strategy of what kind of the enemy object 204 is to be displayed in a static manner. That is, it is possible to take a strategy in the game.

Figure 8:
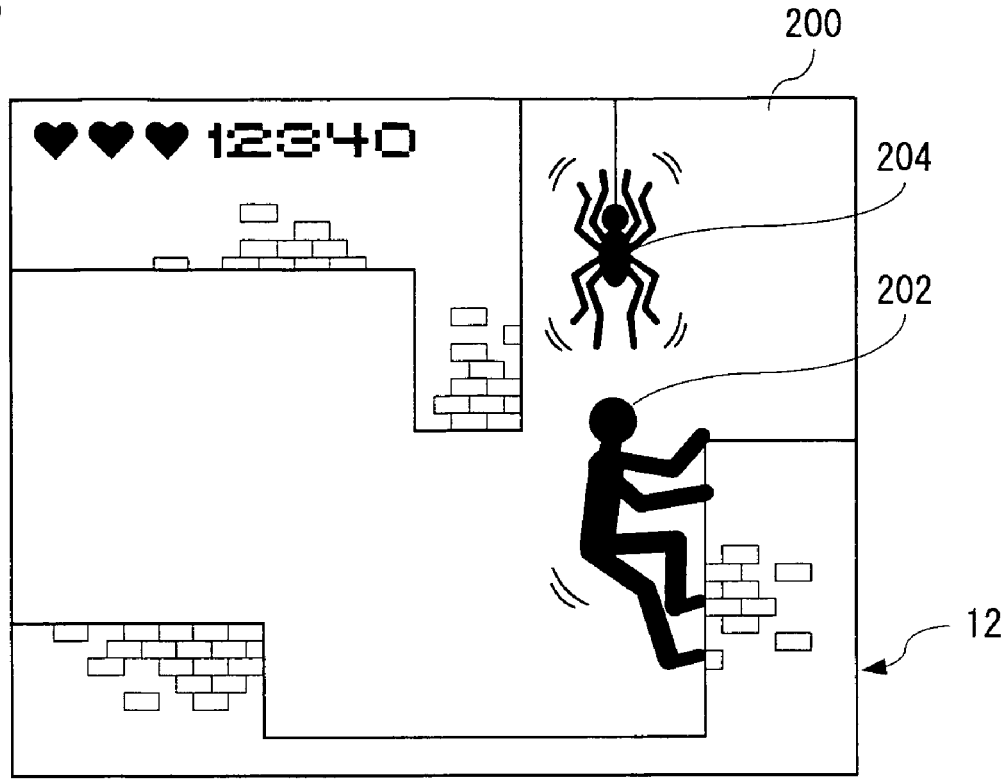
FIG. 8 is an illustrative view showing a further example of a screen to be displayed on the LCD shown in FIG. 1 and FIG. 2.
Figure 8:
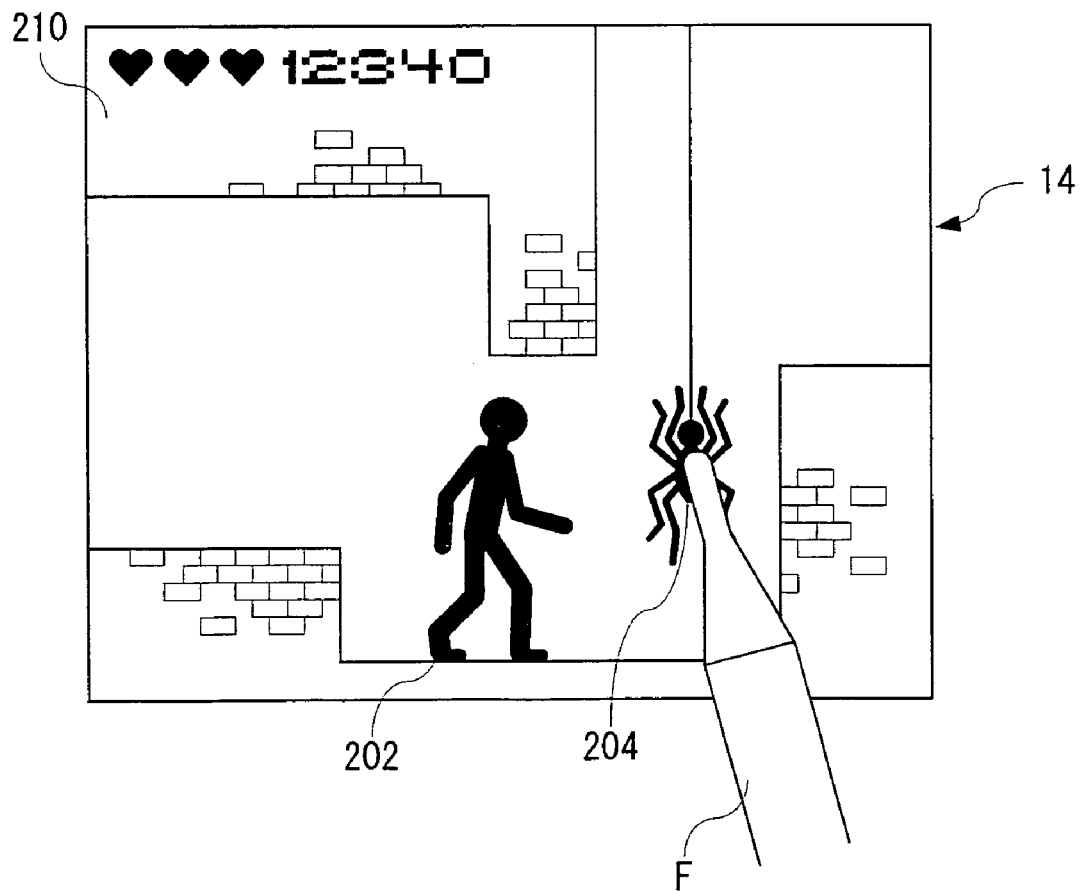

Thereafter, as shown FIG. 8, the player can move the player character 202 in the right direction by operating the cross switch 20a, for example, in a state that the enemy object 204 is frozen. That is, the game can be advanced without fighting.

Figure 9:
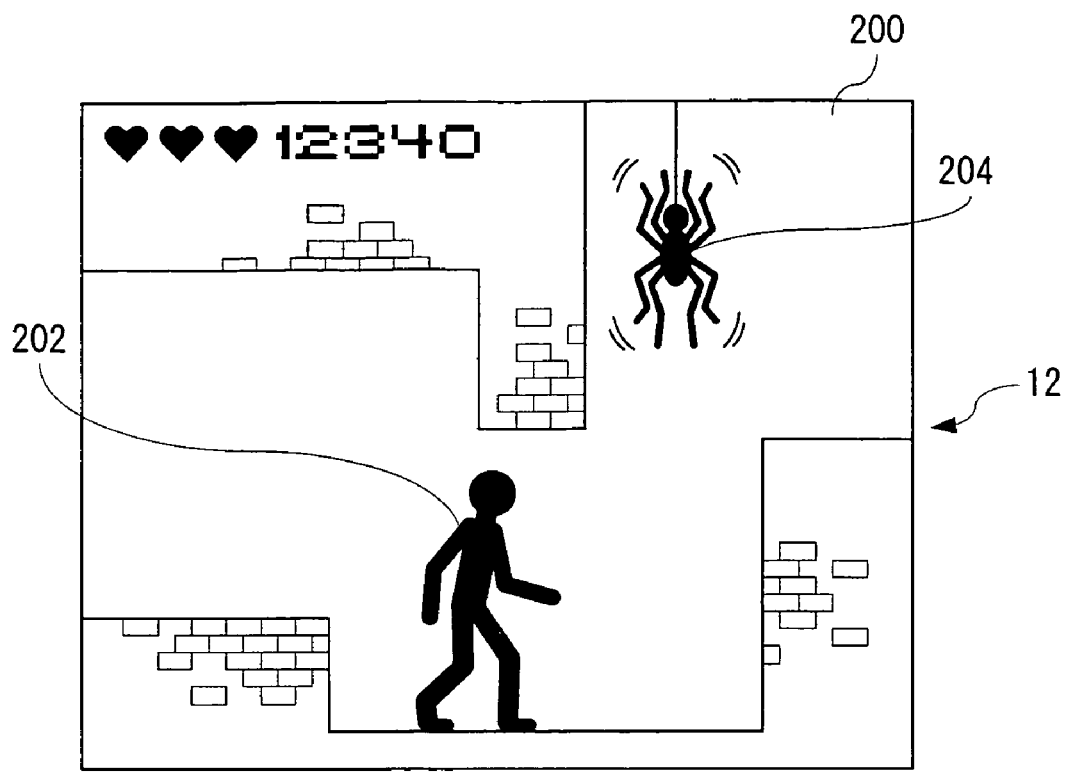
FIG. 9 is an illustrative view showing another example of a screen to be displayed on the LCD shown in FIG. 1 and FIG. 2.
Figure 9:
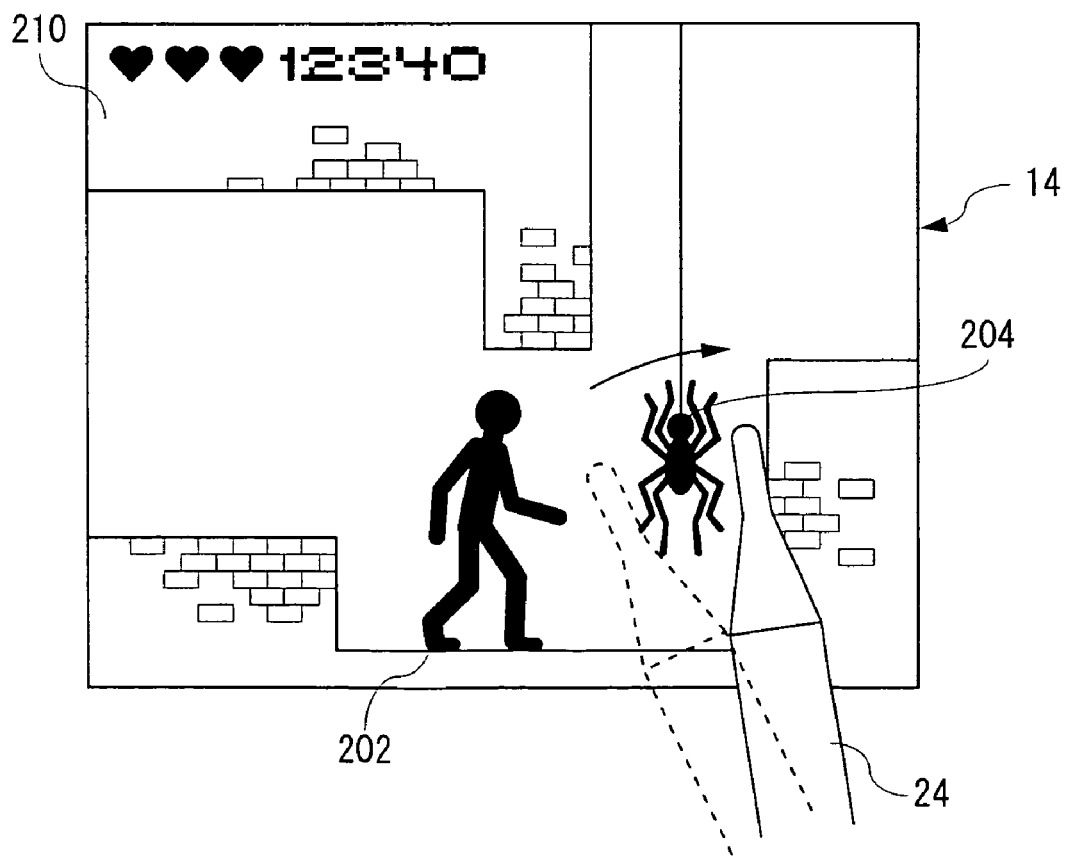
Figure 10:
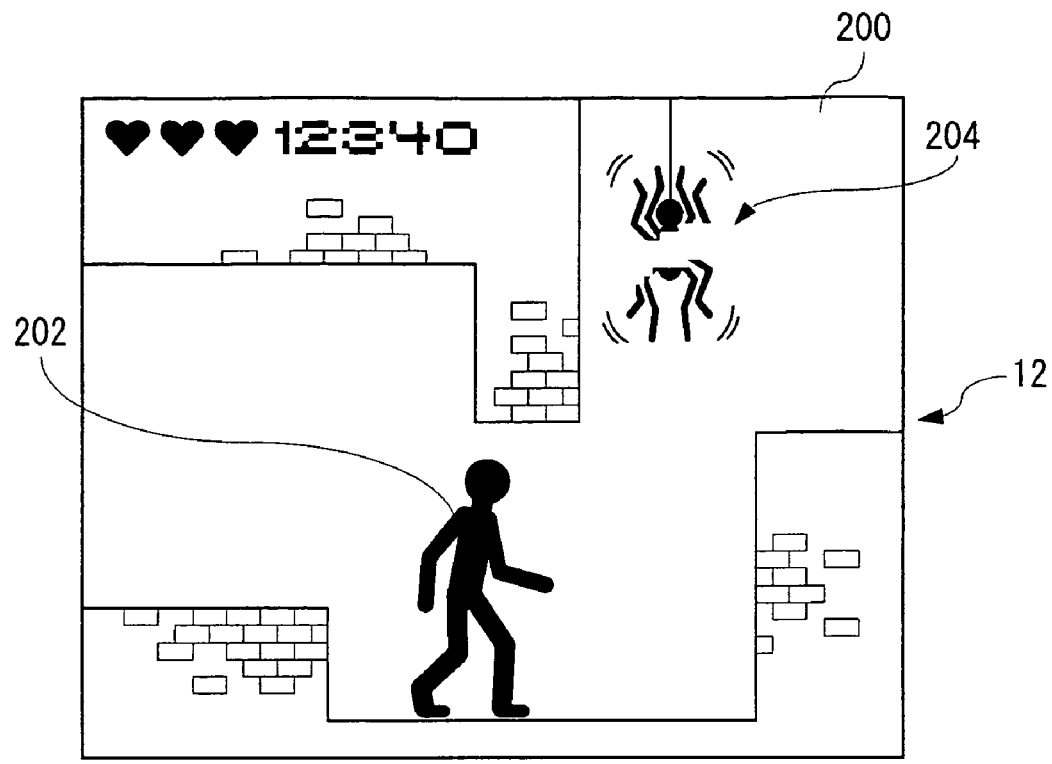
FIG. 10 is an illustrative view showing the other example of a screen to be displayed on the LCD shown in FIG. 1 and FIG. 2.
Figure 10:
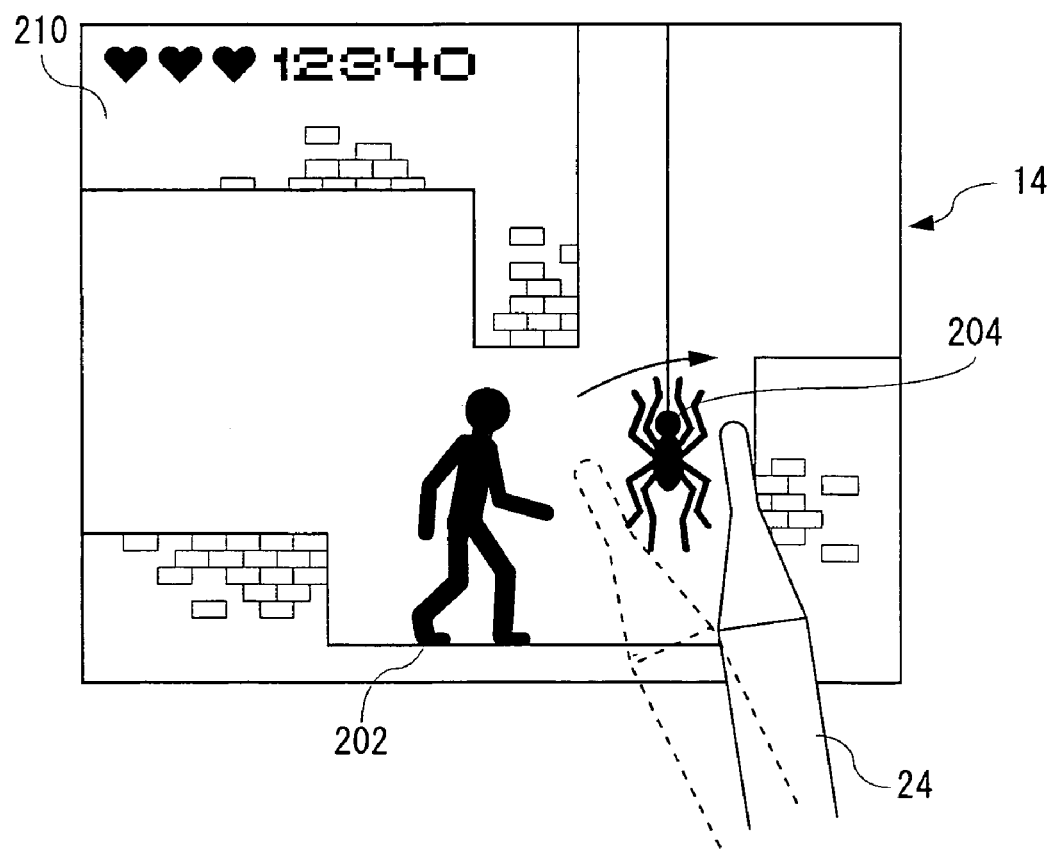

In addition, when the enemy character 204 on the capture screen 210 is stroked (rubbed) with the stylus 24 as shown FIG. 9 in a state that the capture screen 210 is displayed by capturing the game screen 200, the enemy character 204 displayed on the game screen 200 can be displayed in an erasing manner as shown in FIG. 10.

More specifically, the CPU core 42 detects coordinate position data input from the touch panel 22 per unit of time (10 frames), and compares the detected coordinates position data and the object position data fetched at a time of capturing. Here, one frame is a unit of time (1/60 seconds) for updating the game screen 200, and the reason why the coordinate position data is detected every 10 frames is for determining the movement of the hand of the player, that is, accurately distinguishing the directing operation from the rubbing operation. That is, too short a unit of time leads to a misunderstanding, regarding almost all operations as a directing operation.

As a result of the comparison, in a case that the object position data matching with the coordinates position data is absent, the CPU core 42 determines that the enemy object 204 is not directed, clears the coordinate position data buffer area 110, and controls the GPU 50 such that the enemy object 204 is displayed on the LCD 12 according to the normal display program 96a. On the other hand, in a case where the object position data matching with the coordinate position data is present, the CPU core 42 specifies the kind of the enemy object 204 from the object kind data stored in correspondence to the object position data, compares the previous coordinate position data and the current coordinate position data with each other as described above, and then, determines whether or not to display in a static manner or in an erasing manner. The determination method is as described above, and therefore, a duplicate description is omitted.

In a case of displaying in an erasing manner, the enemy object 204 on the game screen 200 is displayed in an erasing manner such that an image (dot or pixel) on a line segment connecting the previous coordinate position and the current coordinate position (straight line connecting two points) is incomplete. However, the enemy object 204 performs an action, etc. (moves up and down, here) set in advance on the game screen 200, and therefore, the position thereof is not necessarily coincident with the position on the capture screen 210. Accordingly, in order to make an incomplete portion of the image of the enemy object 204 to be displayed in an erasing manner coincident between the game screen 200 and the capture screen 210, the previous coordinate position data and the current coordinate position data need to be corrected.

It is noted that in a case of displaying in the erasing manner the entire (all) of the enemy object 204 at one time, it is appropriate that all of the image data corresponding to the relevant enemy object 204 is erased from the VRAM 56, or the image data corresponding to the enemy object is overwritten by the image data of the background object, and therefore, there is no need to make such the correction.

More specifically, first, the CPU core 42 fetches a current position on the game screen 200 as to the enemy object 204 to be displayed in an erasing manner via the GPU 50, and fetches a position (for the sake of convenience, referred to as "static position") on the capture screen 210 as to the enemy object 204 via the GPU 52. Here, the current position and the static position are the same specific position such as the center of the enemy object 204. By use of a difference value between the current position and the static position, the current coordinate position and the previous coordinate position are corrected. The current position is rendered (X1, Y1), the static position is rendered (X0, Y0), the current coordinate position is rendered (x1, y1), and then, the previous coordinate position is rendered (x0, y0). Each of the corrected current coordinates position (x1', y1') and the corrected previous coordinates position (x0', y0') is calculated according to an equation 1 and an equation 2. It is noted that an original point of each of the coordinates on the game screen 200 (LCD 12) and the capture screen 210 (LCD 14) is set to an upper left apex of the screen, and the right direction on the screen is rendered a positive direction of the X axis, and the lower direction on the screen is rendered a positive direction of the Y axis.

$$(x1', y1') = (x1, y1) + \{(X1, Y1) - (X0, Y0)\} \quad \text{[Equation 1]}$$

$$(x0', y0') = (x0, y0) + \{(X1, Y1) - (X0, Y0)\} \quad \text{[Equation 2]}$$

The CPU core 42 calculates the corrected previous coordinate position (x0', y0') and the corrected current coordinate position (x1', y1'), and then controls the GPU 50 so as to erase an image on the line segment connecting these positions. For example, the GPU 50 overwrites an image of the background object corresponding to the line segment. Accordingly, as shown in FIG. 10, the enemy object 204 a part of which is incomplete (erased) is displayed on the game screen 200.

It is noted that although only the enemy object 204 on the game screen 200 is displayed in an erasing manner in this exemplary illustrative embodiment, the enemy object 204 on the capture screen 210 may also be displayed in an erasing manner. In this case, the CPU core 42 controls the GPU 52 so as to erase the pixels of the line segment connecting the previous coordinate position and the current coordinate position, and in response thereto, the GPU 52 overwrites an image of the corresponding background object on the line segment.

Furthermore, in a case of displaying in an erasing manner in this exemplary illustrative embodiment, the image of the background object corresponding to the relevant portion is overwritten in this embodiment. However, the relevant portion may be overwritten by a line (line segment) in arbitrary color. It is noted that since the erasing manner of the enemy object 204 needs to be displayed, a color distinct from the enemy object 204 has to be selected. Alternatively, in a case of being able to utilize a transparent color, by overwriting the relevant portion in the transparent color, the erasing manner of the enemy object 204 can be displayed.

Figure 11:
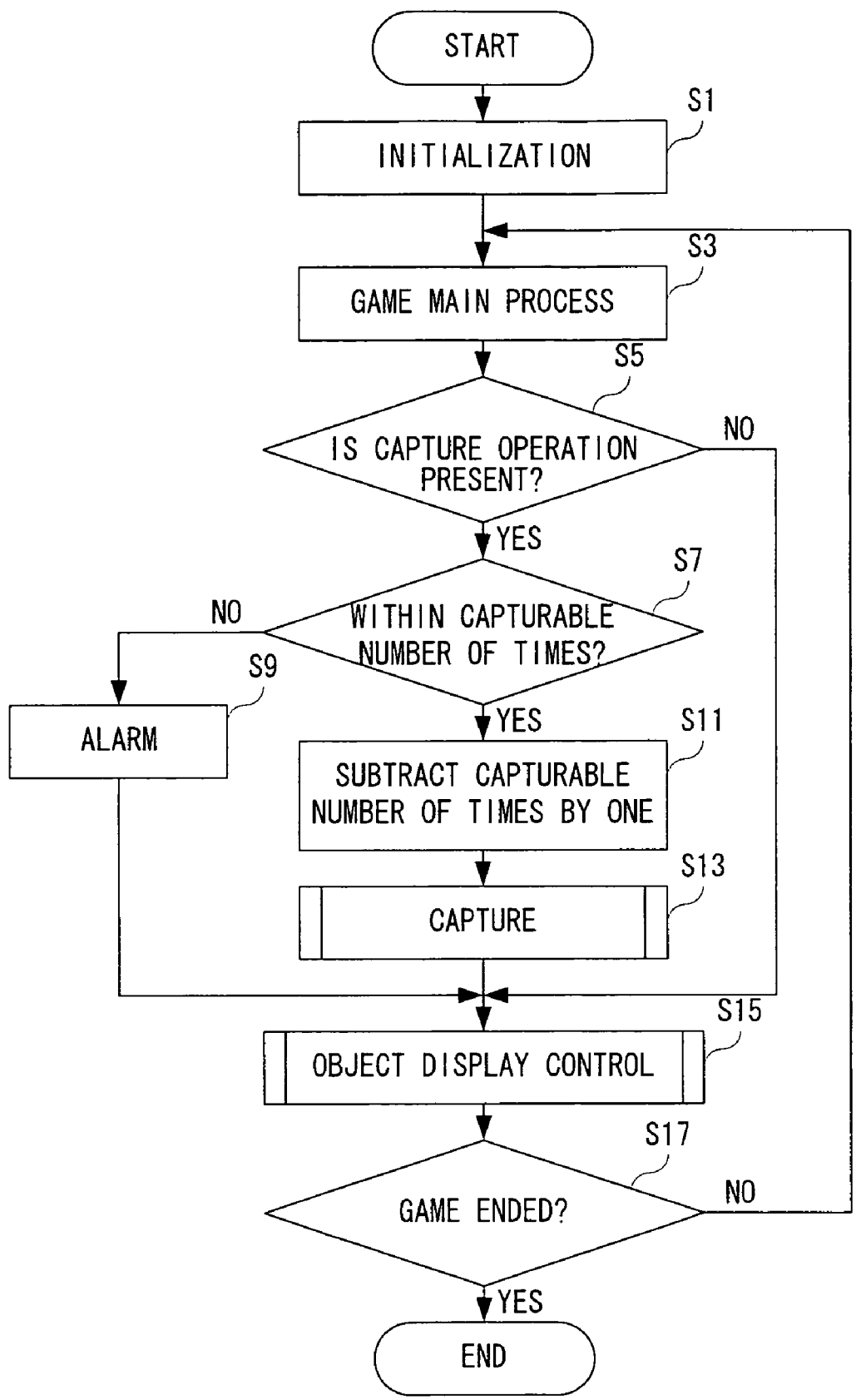
FIG. 11 is a flowchart showing a game process of a CPU core shown in FIG. 2.

More specifically, the CPU core 42 shown in FIG. 2 executes a game process according to a flowchart shown in FIG. 11. The CPU core 42 performs an initialization in a step S1 at a start of the game process. Here, for example, the VRAM 56 and the VRAM 58 are initialized (cleared), various flags stored in the RAM 48 are reset (turned off), and so forth.

It is noted that in a case where the player starts the game where he previously quits, flags included in the stored (saved) game data are not reset.

In a succeeding step S3, a game main process is executed. Here, according to the story set in advance, a display of the background object on the game screen 200 is controlled, according to the operation by the player, a movement, etc. of the player character 202 is controlled, and the display thereof is controlled. Furthermore, a sound necessary for the game is output, and a backup process of the game data is executed according to an instruction by the player or according to the predetermined event.

In a next step S5, it is determined whether or not a capture operation is present. That is, it is determined whether or not the L button 20L or the R button 20R is turned on. If the capture operation is absent, "NO" in the step S5, and the process directly proceeds to a step S13. On the other hand, if the capture operation is present, "YES" in the step S5, it is determined to be within capturable number of times in a step S7. More specifically, it is determined whether or not the count value of the capturable number of times data 104 is equal to or more than "1".

If "NO" in the step S7, that is, if the capturable number of times is "0", by determining that the game screen 200 cannot be captured, an alarm is generated in a step S9, and the process proceeds to a step S15. For example, in the step S9, an alarm message is displayed on the LCD 12 (game screen 200) and the LCD 14, or an alarm sound is output from the speaker 32. Alternatively, both of the display of the alarm message and the output of the alarm sound may be executed.

On the other hand, if "YES" in the step S7, that is, if the capturable number of times is equal to or more than "1", the capturable number of times is subtracted by 1 (decremented) in a step S11, a capture process (see FIG. 12) described later is executed in a step S13, and then, the process proceeds to step S15.

In step S15, an object display controlling process (see FIG. 13) described later is executed. Then, in a step S17, it is determined whether or not the game is ended. Here, it is determined whether or not an instruction of the game end is input by the player, or whether the game over or not. If "NO" in the step S17, that is, if it is not the game end, the process directly returns to the step S3 to continue the game. On the other hand, if "YES" in the step S17, that is, if it is the game end, the game process is ended.

Figure 12:
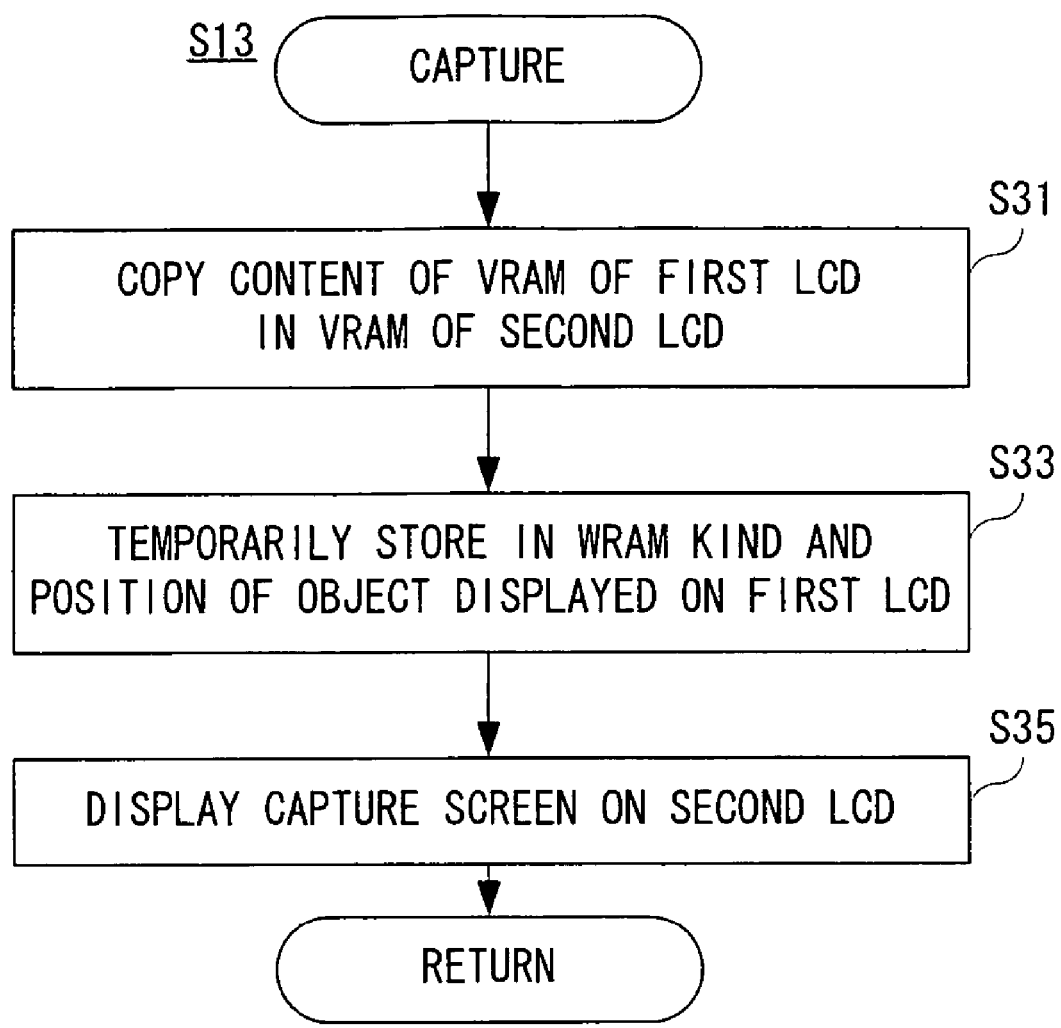
FIG. 12 is a flowchart showing a capturing process of the CPU core shown in FIG. 2.

FIG. 12 is a flowchart showing the capture process in the step S13 shown in FIG. 11. Referring to FIG. 12, when the CPU core 42 starts the capture process, a content of the VRAM 56 of the first LCD, that is, the LCD 12 is copied in the VRAM 58 of the second LCD, that is, the LCD 14 in a step S31. Next, in a step S33, a kind and a position of the object displayed on the LCD 12 are temporarily stored in the WRAM. That is, object data as to the object is stored in the object data buffer area 106 of the RAM 48. Then, in a step S35, the capture screen 210 is displayed on the LCD 14, and the capture process is returned.

FIG. 13 is a flowchart showing the object display controlling process in the step S15 shown in FIG. 11. Referring to FIG. 13, when the CPU core 42 starts the object display controlling process, it is determined whether or not a unit of time (10 frames, for example) elapses in a step S41. The unit of time is counted by an internal timer, although omitted in FIG. 2, within the game apparatus 10. The internal timer is a timer for counting 10 frames (about 160 msec), for example, and starts to count according to an instruction by the CPU core 42 at a start of the game, and is reset to be started when being counted up. This process is repeated until the end of the game.

In "NO" in step S41, that is, if the unit of time does not elapse, the object display controlling process is directly returned. However, if "YES" in step S41, that is, if the unit of time elapses, it is determined whether or not the touch panel 22 is operated in a step S43. That is, it is determined whether or not the coordinates position data is input from the touch panel 22.

If the coordinate position data is not input, that is, if the touch panel 22 is not operated, "NO" in the step S43, the coordinate position data buffer area 110 is cleared in a step S57, the enemy object 204 on the game screen 200 is regularly-displayed in a step S59, and then, the object display controlling process is returned. That is, in the step S59, an object display control according to the normal display program 96a is executed.

On the other hand, if the coordinate position data is input, that is, if the touch panel 22 is operated, "YES" in the step S43, and the coordinate position data is fetched in a step S45. That is, the coordinate position data input from the touch panel 22 is written to the coordinate position data buffer area 110.

In a following step S47, it is determined whether or not the coordinate position data fetched in step S45 is within the display area of the object (enemy object 204) displayed on the LCD 14 (capture screen 210). That is, it is determined whether or not the object position data matching with the fetched coordinate position data is stored in coordinate position data buffer area 110. If "NO" in the step S47, that is, if it is out of the display area of the object 204, it is determined that the object 204 is not directed, and so forth, and the process proceeds to step S57.

Furthermore, if "YES" in step S47, that is, if it is within the display area of the object 204, with reference to the coordinate position data buffer area 110, the previous coordinate position data and the current coordinate position data are compared with each other in a step S49. Then, in a step S51, it is determined whether or not the coordinate position data is changed. If "NO" in step S51, that is, if the coordinates position data is not changed, the static display process of the enemy object 204 is executed in a step S53, and the object display controlling process is returned. On the other hand, if "YES" in step S51, that is, if the coordinates position data is changed, an erasing (scratch) display process is executed in a step S55, and then, the object display controlling process is returned.

It is noted that although a flowchart showing a detailed processing of the static display process and the erasing display process is omitted, the content of the process is as described above.

In addition, in this exemplary illustrative embodiment, if "NO" in step S31, the static display process is directly executed. However, in some cases, the player stops erasing in the middle of the erasing operation, and even in such the case, in order to distinguish from the static operation, further coordinates position data is fetched to determine whether the static operation or the erasing operation.

Figure 14:
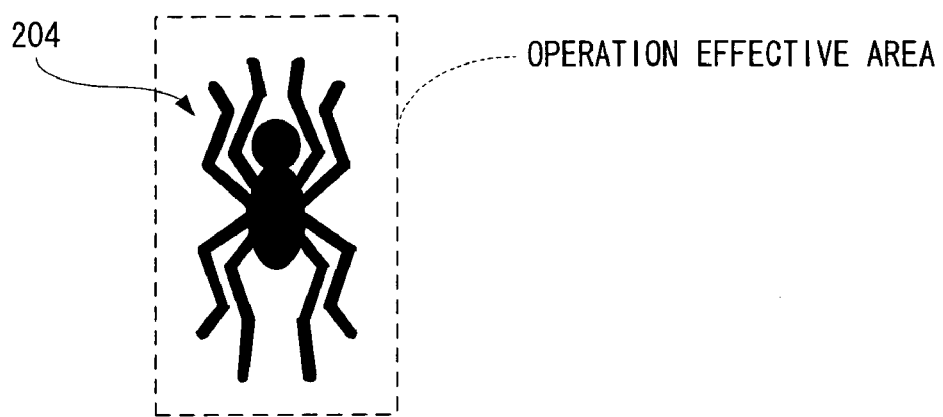
FIG. 14 is an illustrative view showing an operation effective area to be set to an object.
Figure 14:
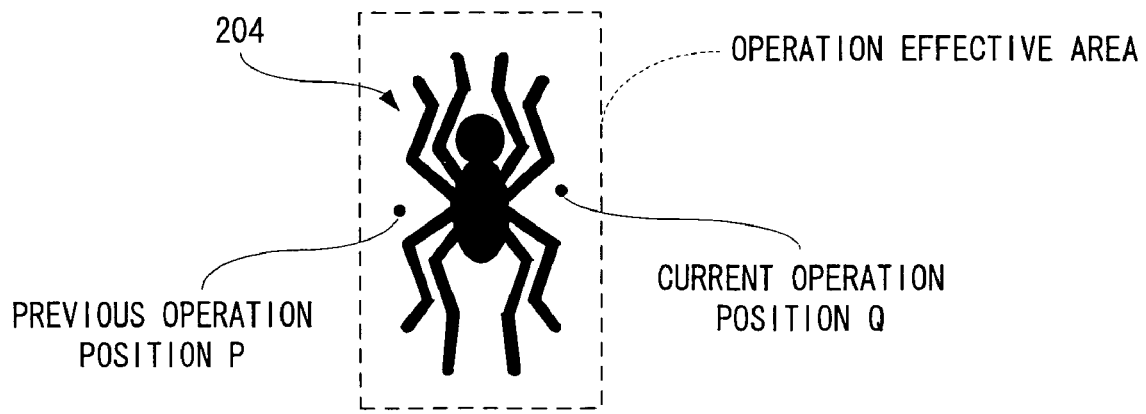

As described above, in this exemplary illustrative embodiment, whether or not the enemy object 204 is directed, and so forth depends on whether or not the coordinate position data exists within the area (display area) on which the enemy object 204 is actually displayed. However, the operation to the touch panel 22 can be performed by a finger, and therefore, in some cases, it is impossible to accurately direct, and so forth the display area of the enemy object 204. In addition, in a case of erasing the enemy object 204, it is easily presumable that the stylus 24 etc. extends off the display area. Accordingly, as shown in FIG. 14 (A), as to the enemy object 204, an operation effective area larger than the display area is prepared, and if the coordinate position data is within the operation effective area, it is determined that the enemy object 204 is directed, and so forth. In this case, in step S33 shown in FIG. 12, data collection of the position coordinate corresponding to each dot of the LCD 12 existing within the operation effective area including the display area of the object displayed on the LCD 12 is stored in the RAM 48 as the object position data, and in the step S47 as shown in FIG. 13, it is determined whether or not to be within the operation effective area by use of the object position data.

It is noted that if the operation effective area is rendered too large, although the enemy object 204 is not directed, and so forth, it is frozen or erased, and therefore, the dimension thereof has to be adequately set by an examination, etc. Furthermore, it may be possible that whether or not a point on the line segment connecting the previous coordinate position and the current coordinate position exists within the display area is determined.

According to this exemplary illustrative embodiment, two LCDs are prepared, a game screen is displayed on the one screen, and a static image obtained by capturing the game screen is displayed on the other screen, and whereby, operations on the capture screen are reflected on the game screen and the game play, capable of realizing a cutting-edge game operation. That is, a novel operation is possible.

It is noted that although the touch panel is provided in relation to the second LCD in this embodiment, the touch panel may be provided in relation to the first LCD, or the touch panel may also be provided in relation to both of the LCDs. In the former, the game screen is displayed on the second LCD and the capture screen is displayed on the first LCD. In the latter, according to a menu selection by the player, the game screen is displayed on the one LCD, and the capture screen is displayed on the other LCD.

Figure 15:
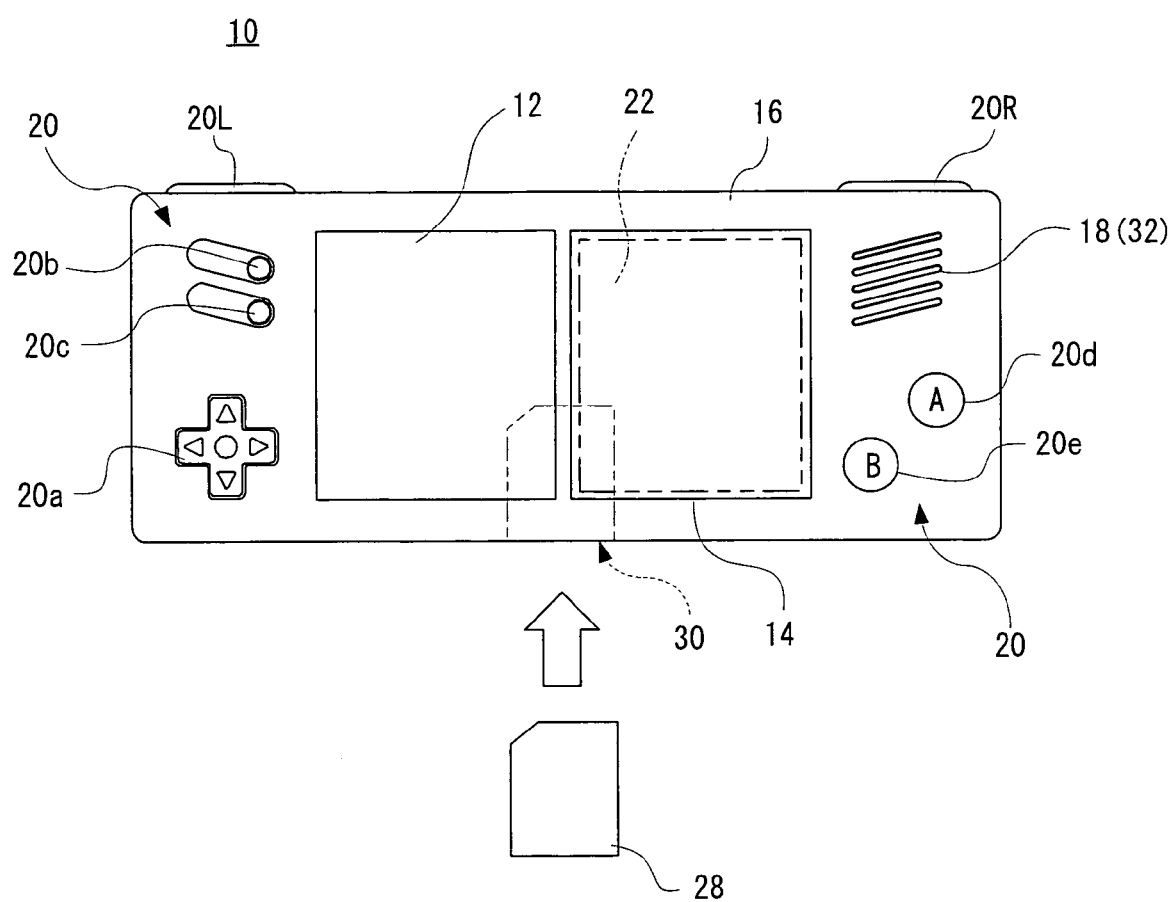
FIG. 15 is an illustrative view showing an appearance of another exemplary illustrative game apparatus.

Furthermore, although the first LCD and the second LCD are vertically arranged in this embodiment, these are structured so as to be horizontally arranged according to circumstances. For example, as shown in FIG. 15, one horizontally long housing 16 is prepared, and the LCD 12 may be arranged at the left side of the center of the housing 16, and the LCD 14 (and the touch panel 22) may be arranged at the right side of the center of the housing 16. It is noted that as described above, the touch panel 22 can be provided on the LCD 12 side, or may be provided on both of the LCD 12 side and the LCD 14 side.

Figure 16:
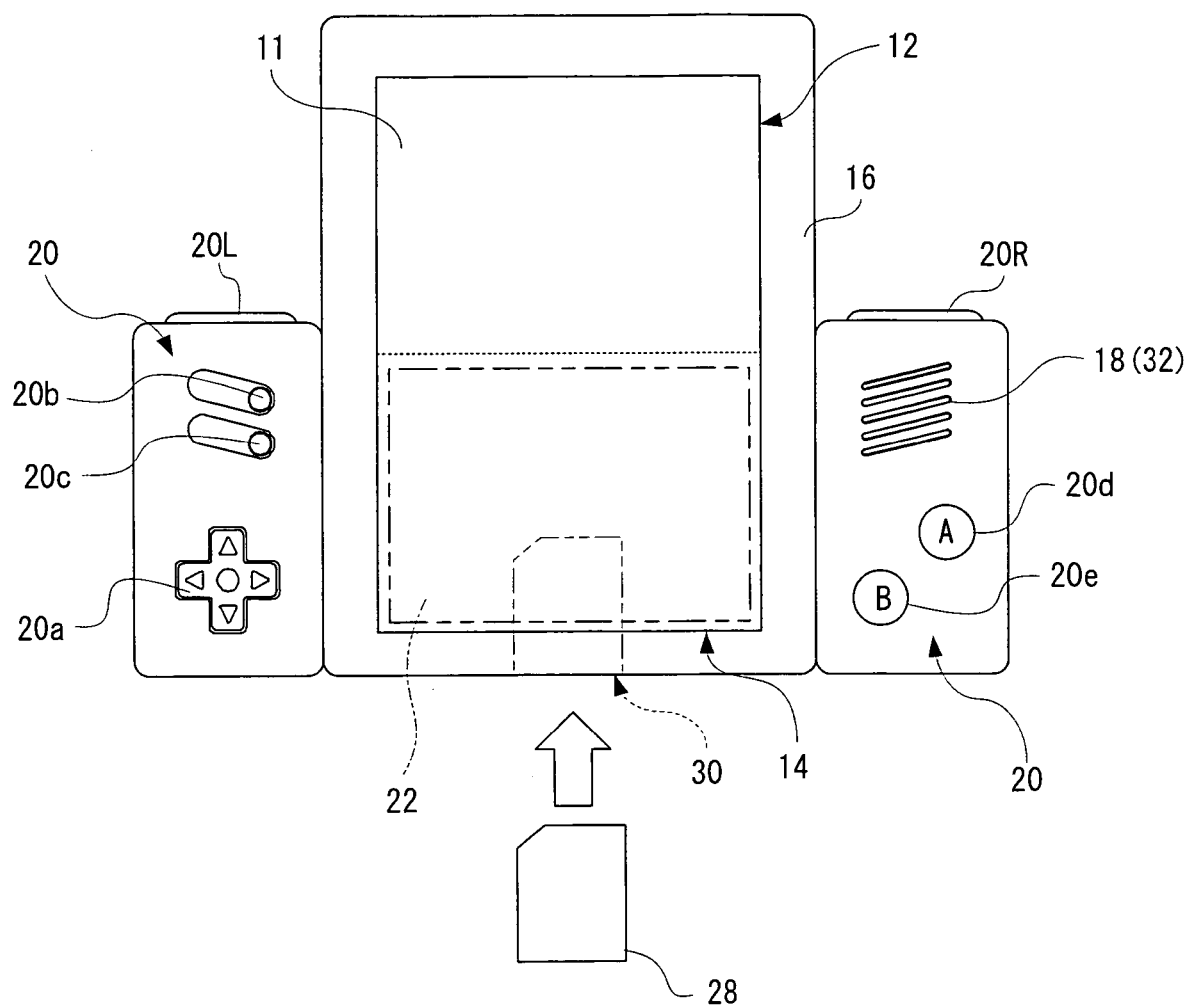
FIG. 16 is an illustrative view showing an appearance of another exemplary illustrative game apparatus.

In addition, although the first LCD and the second LCD are separately provided in this exemplary illustrative embodiment, by dividing the display surface of one LCD into two, a touch panel may be provided in relation to at least one display surface. For example, as shown in FIG. 16, one LCD 11 is provided on the center of the housing 16 so as to form a vertically long shape, and this is divided into two up and down at the center thereof to form the first LCD 12 and the second LCD 14. In this case, the touch panel 22 is provided on the second LCD 14 side, for example. It is noted that the touch panel 22 may be provided on the first LCD 12 side, or it may be provided on both of the first LCD 12 and the second LCD 14, that is, may be provided so as to cover the entire portion of the LCD 11. Furthermore, as shown in FIG. 15, in a case of horizontally arranging the first LCD and the second LCD, one LCD is provided at the center of the housing 16 so as to form a horizontally long shape, and this is divided into two left and right at the center thereof to form the first LCD and the second LCD.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus in which an action game is played by displaying a game image including a player character and other objects, comprising:
   a first display portion for displaying said game image;
   a second display portion for displaying a captured image obtained by capturing at least said game image, and being different from said first display portion;
   a touch panel mounted in relation to said second display portion for detecting operation information;
   a first image storing memory for temporarily storing first image data corresponding to said game image;
   a second image storing memory for temporarily storing second image data corresponding to said captured image;
   an operation position detector which detects a touch operation position based on the operation information detected by a touch operation of said touch panel;
   an operating mechanism for inputting a button operation and a direction instructing operation by a player;
   a game processor which processes said action game according to an operation by said operating mechanism;
   a player character display mechanism which displays said player character on said first display portion according to an operation by said operating mechanism;
   an object data storing memory for storing object data including at least kind data and display position data as to said object;
   an object displaying mechanism for displaying said object on said first display portion in correspondence with progress of said action game by said game processor;
   an image capturing mechanism for copying and storing in said second image storing memory according to said operating mechanism the first image data stored in said first image storing memory as second image data; and
   an operation position determining mechanism for, after the first image data stored in said first image storing memory is copied and stored as the second image data in said second image storing memory, determining whether or not the touch operation position detected by said operation position detecting mechanism is within a display area of an object to be displayed on the second display portion based on the object data stored by said object data storing memory, wherein
   said object displaying mechanism controls display of said object on said first display portion based on a determination result of said operation position determining mechanism.

2. A game apparatus according to claim 1, wherein said object displaying mechanism displays in a static manner said object corresponding to said display area on said first display portion when a determination result by said operation position determining mechanism exists within said display area.

3. A game apparatus according to claim 1, further comprising an operation position storing memory for storing the touch operation position detected by said operation position detector when a determination result by said operation position determining mechanism shows within said display area; and a comparator which compares a current touch operation position and a previous touch operation position that are stored by said operation position storing memory, wherein said object displaying mechanism displays in a static manner said object corresponding to said display area on said first display portion when a comparison result by said comparator shows a coincidence, and displays in an incomplete manner said object corresponding to said display area on said first display portion such that a portion equal to a line segment connecting at least said previous touch operation position and said current touch operation position is incomplete when a comparison result by said comparator shows inconsistency.

4. A game apparatus according to claim 1, wherein said object data storing memory stores said object data respectively corresponding to a plurality of kinds of said objects, further comprising an object kind specifier which specifies a kind of said object based on said object data of the object that is determined to be within the display area by said operation position determining mechanism, wherein said object displaying mechanism controls display of the object with the kind specified by said object kind specifier on said first display portion.

5. A game apparatus according to claim 1, further comprising a capturable number of times storing memory for storing a limited number of times of copying of said first image data by said image capturing mechanism;

a counter which counts the number of times of copying of the first image data by said image capturing mechanism; and an inactivator which inactivates said image capturing mechanism when the number of times of copying is above said capturable number of times.

6. A computer-readable storage medium encoded with a game computer program for playing an action game on a game apparatus by displaying a game image including a player character and other objects, said game apparatus, comprising:

a first display portion for displaying said game image;

a second display portion for displaying a captured image obtained by capturing at least said game image, and being different from said first display portion;

a touch panel mounted in relation to said second display portion for detecting operation information;

a first image storing memory for temporarily storing first image data corresponding to said game image;

a second image storing memory for temporarily storing second image data corresponding to said captured image; and an operating mechanism for inputting a button operation and a direction instructing operation by a player, wherein said game computer program causes a processor of said game apparatus to execute following steps of:

detecting an operation position based on the operation information detected by a touch operation of said touch panel;

processing said action game according to an operation by said operating mechanism;

displaying said player character on said first display portion according to an operation by said operating mechanism;

displaying said object on said first display portion in correspondence with progress of said action game by said processing of said action game;

copying and storing in said second image storing memory the first image data stored in said first image storing memory as second image data according to an operation by said operating mechanism;

an object data storing step for storing object data including at least kind data and display position data as to said object when the first image data stored in said first image storing memory is copied as the second image data in said second image storing memory; and determining, after the first image data stored in said first image storing memory is copied and stored as the second image data in said second image storing memory, whether or not the touch operation position detected by said detecting of said operation position is within a display area of an object to be displayed on the second display portion based on the object data stored by said storing of the object data, wherein said object displaying controls display of said object on said first display portion based on a determination result by said determining of the operation position.

7. A storage medium encoded with a game computer program according to claim 6, wherein said object displaying displays in a static manner said object corresponding to said display area on said first display portion when a determination result by said determining of the operation position shows within said display area.

8. A storage medium encoded with a game computer program according to claim 6, wherein said game computer program further executes:

storing the touch operation position detected by said detecting of the operation position when a determination result by said determining of the operation position shows within said display area; and comparing a current touch operation position and a previous touch operation position that are stored by said operation position storing step, wherein said object displaying displays in a static manner said object corresponding to said display area on said first display portion when a comparison result by said comparing shows a coincidence, and displays in an incomplete manner said object corresponding to said display area on said first display portion such that a portion equal to a line segment connecting at least said previous touch operation position and said current touch operation position is lacking when a comparison result by said comparing step shows inconsistency.

9. A storage medium encoded with a game computer program according to claim 6, wherein said object data storing step stores said object data respectively corresponding to a plurality of kinds of said objects, said game computer program executes specifying a kind of said object based on said object data of the object that is determined to be within said display area by said determining of the operation position; and said object displaying controls display of the object with the kind specified by said specifying of the object kind on said first display portion.

10. A storage medium encoded with a game computer program according to claim 6, wherein said game apparatus further executes storing a limited number of times of copying of said first image data by said image capturing, and said game computer program executes counting the number of times of copying of the first image data by said image capturing and inactivating said image capturing when the number of times of copying is above said capturable number of times.

* * * * *